(12) United States Patent
Seo et al.

(10) Patent No.: US 8,737,289 B2
(45) Date of Patent: May 27, 2014

(54) METHOD FOR TRANSMITTING AND RECEIVING SIGNAL OF RELAY IN RADIO COMMUNICATION SYSTEM SUPPORTING MULTIPLE CARRIERS

(75) Inventors: Han Byul Seo, Anyang-si (KR); Byoung Hoon Kim, Anyang-si (KR); Ki Jun Kim, Anyang-si (KR); Hak Seong Kim, Anyang-si (KR)

(73) Assignee: LG Electronics Inc., Seoul (KR)

( * ) Notice: Subject to any disclaimer, the term of this patent is extended or adjusted under 35 U.S.C. 154(b) by 122 days.

(21) Appl. No.: 13/497,246

(22) PCT Filed: Oct. 26, 2010

(86) PCT No.: PCT/KR2010/007369
§ 371 (c)(1),
(2), (4) Date: Mar. 20, 2012

(87) PCT Pub. No.: WO2011/052964
PCT Pub. Date: May 5, 2011

(65) Prior Publication Data
US 2012/0201191 A1 Aug. 9, 2012

Related U.S. Application Data

(60) Provisional application No. 61/313,091, filed on Mar. 11, 2010, provisional application No. 61/255,826, filed on Oct. 28, 2009.

(51) Int. Cl.
*H04W 88/04* (2009.01)
*H04W 72/04* (2009.01)

(52) U.S. Cl.
USPC .......................... 370/315; 370/328

(58) Field of Classification Search
USPC .......................... 370/315, 328, 329, 524, 529
See application file for complete search history.

(56) References Cited

U.S. PATENT DOCUMENTS

| | | | | |
|---|---|---|---|---|
| 8,472,366 | B2 * | 6/2013 | Xu et al. | 370/315 |
| 2009/0209265 | A1 | 8/2009 | Kwon et al. | |
| 2009/0252203 | A1 | 10/2009 | Goldhamer | |
| 2010/0214972 | A1 * | 8/2010 | Che et al. | 370/315 |
| 2010/0238845 | A1 * | 9/2010 | Love et al. | 370/280 |
| 2011/0075684 | A1 * | 3/2011 | Zeng et al. | 370/475 |
| 2012/0087442 | A1 * | 4/2012 | Xu et al. | 375/299 |

FOREIGN PATENT DOCUMENTS

EP 2109334 10/2009

* cited by examiner

*Primary Examiner* — Brian D Nguyen
(74) *Attorney, Agent, or Firm* — Lee, Hong, Degerman, Kang & Waimey

(57) ABSTRACT

Disclosed herein is a radio communication system, and more particularly, to a method and apparatus for transmitting and receiving a signal on a backhaul link and an access link of a relay in a radio communication system supporting multiple carriers. The method for transmitting and receiving a signal in a relay node operating on multiple carriers includes receiving a control channel from a base station, determining the type of the control channel, determining an in-band operation mode or an out-band operation mode based on the determined type of the control channel, and transmitting and receiving the signal to at least one of the base station and a user equipment according to the determined operation mode. The multiple carriers include one or more in-band component carriers and one or more out-band component carriers.

6 Claims, 17 Drawing Sheets

(a)

(b)

(a)

(b)

(a)

(b)

(a)

(b)

METHOD FOR TRANSMITTING AND RECEIVING SIGNAL OF RELAY IN RADIO COMMUNICATION SYSTEM SUPPORTING MULTIPLE CARRIERS

CROSS-REFERENCE TO RELATED APPLICATIONS

This application is the National Stage filing under 35 U.S.C. 371 of International Application No. PCT/KR2010/007369, filed on Oct. 26, 2010, which claims the benefit of U.S. Provisional Application Ser. Nos. 61/313,091, filed on Mar. 11, 2010, and 61/255,826, filed on Oct. 28, 2009, the contents of which are all incorporated by reference herein in their entirety.

TECHNICAL FIELD

The present invention relates to a radio communication system, and more particularly, to a method and apparatus for transmitting and receiving a signal on a backhaul link and an access link of a relay in a radio communication system supporting multiple carriers.

BACKGROUND ART

FIG. 1 shows a relay node (RN) 120 and User Equipments (UEs) 131 and 132 located in an area of one base station (or eNodeB or eNB) 110 in a radio communication system 100. The RN 120 may transmit data received from the eNodeB 110 to the UE 132 located in an RN area and transmit data received from the UE 132 located in the RN area to the eNodeB 110. In addition, the RN 120 may expand a high data rate area, improve communication quality in a cell edge, and support provision of communication in a building or in an area other than a base station service area. In FIG. 1, the UE 131 (hereinafter, referred to as a macro-UE or M-UE) which directly receives a service from the eNodeB and the UE 132 (hereinafter, referred to as a relay-UE or R-UE) which receives a service from the RN 120 are shown.

A wireless link between the eNodeB and the RN is called a backhaul link. A link from the eNodeB to the RN is called a backhaul downlink and a link from the RN to the eNodeB is called a backhaul uplink. In addition, a wireless link between the RN and the UE is called an access link. A link from the RN to the UE is called an access downlink and a link from the UE to the RN is called an access uplink.

In a general radio communication system, only one carrier is mainly considered even when the bandwidths of the uplink and the downlink may be differently set. For example, a radio communication system in which the number of carriers configuring the uplink or the downlink is 1 and the bandwidth of the uplink and the bandwidth of the downlink are generally symmetrical to respect to each other may be provided based on a single carrier.

International Telecommunication Union (ITU) has requested candidate technologies of the IMT-Advanced to support an extended bandwidth, compared with the existing radio communication system. However, it is difficult to allocate a frequency having a large bandwidth in the whole world excluding some regions. Accordingly, as technologies of efficiently using a plurality of small bands, carrier aggregation, bandwidth aggregation or spectrum aggregation technologies of physically aggregating a plurality of bands in a frequency domain so as to logically obtain the same effect as the use of a large band have been developed. The carrier aggregation technology may be also called multi-carrier technology.

The carrier aggregation technology is introduced in order to increase throughput, to prevent cost increase due to introduction of a wideband RF element, and to guarantee compatibility with the existing system. The carrier aggregation technology refers to technology of exchanging data between a UE and an eNodeB by aggregating a plurality of carriers in a bandwidth unit defined in the existing radio communication system (e.g., a Long Term Evolution (LTE) system in case of an LTE-A system or an IEEE 802.16e system in case of an IEEE 802.16m system). A carrier of the bandwidth unit defined in the existing radio communication system may be called a Component Carrier (CC). For example, the carrier aggregation technology may include technology of supporting a maximum system bandwidth of 100 MHz by aggregating a maximum of five CCs even when one CC supports a bandwidth of 5 MHz, 10 MHz or 20 MHz. The carrier aggregation technology may be applied to the uplink and the downlink and may have a symmetric or asymmetric configuration in the uplink and the downlink. The carrier aggregation (or multi-carrier) technology may be applied to the backhaul link between the eNodeB and the RN and/or the access link between the RN and the UE.

DISCLOSURE OF INVENTION

Technical Problem

An object of the present invention devised to solve the problem lies on a method for efficiently transmitting and receiving a backhaul link signal, in a relay which operates on multiple carriers, in consideration of access link allocation.

Another object of the present invention devised to solve the problem lies on a method for efficiently transmitting and receiving a signal on a backhaul link and an access link in a relay, if the relay performs a mixture of an in-band operation and an out-band operation on multiple carriers.

Solution to Problem

The object of the present invention can be achieved by providing a method for transmitting and receiving a signal in a relay node operating on multiple carriers, the method including: receiving a control channel from a base station; determining the type of the control channel; determining an in-band operation mode or an out-band operation mode based on the determined type of the control channel; and transmitting and receiving the signal to and from at least one of the base station and a user equipment according to the determined operation mode, wherein the multiple carriers include one or more in-band component carriers and one or more out-band component carriers.

The type of the control channel may be determined depending on whether the component carrier through which the control channel is received is the in-band component carrier or the out-band component carrier.

The control channel may be received through a primary component carrier of the multiple carriers.

The primary component carrier may be one of the one or more out-band component carriers.

The control channel may include at least one of control information for a channel of the same type as the control channel and control information for a channel of a type different from that of the control channel.

The channel type may be a UE-channel or an R-channel.

The in-band operation mode may be an operation mode in which a backhaul link between the base station and the relay and an access link between the relay and the UE are set on the same component carrier, and the out-band operation mode may be an operation mode in which the backhaul link between the base station and the relay and the access link between the relay and the UE are set on different component carriers.

In another aspect of the present invention, provided herein is a relay node operating on multiple carriers, the relay including: a reception module configured to receive a backhaul downlink from a base station and an access uplink from a user equipment; a transmission module configured to transmit a backhaul uplink to the base station and an access downlink to the user equipment; and a processor configured to control the reception module and the transmission module, wherein the processor is further configured to receive a control channel from the base station through the reception module, determine the type of the control channel, determine an in-band operation mode or an out-band operation mode based on the determined type of the control channel, and transmit and receive a signal to and from at least one of the base station and the user equipment according to the determined operation mode, and wherein the multiple carriers include one or more in-band component carriers and one or more out-band component carriers.

Advantageous Effects of Invention

According to the present invention, it is possible to provide a method and apparatus for efficiently performing backhaul link signal transmission/reception, in a relay which operates on multiple carriers, in consideration of access link allocation. In addition, it is possible to provide a method and apparatus for efficiently transmitting and receiving a signal on a backhaul link and an access link in a relay, if the relay performs a mixture of an in-band operation and an out-band operation on multiple carriers.

BRIEF DESCRIPTION OF DRAWINGS

The accompanying drawings, which are included to provide a further understanding of the invention, illustrate embodiments of the invention and together with the description serve to explain the principle of the invention.

In the drawings.

BEST MODE FOR CARRYING OUT THE INVENTION

Figure 1:
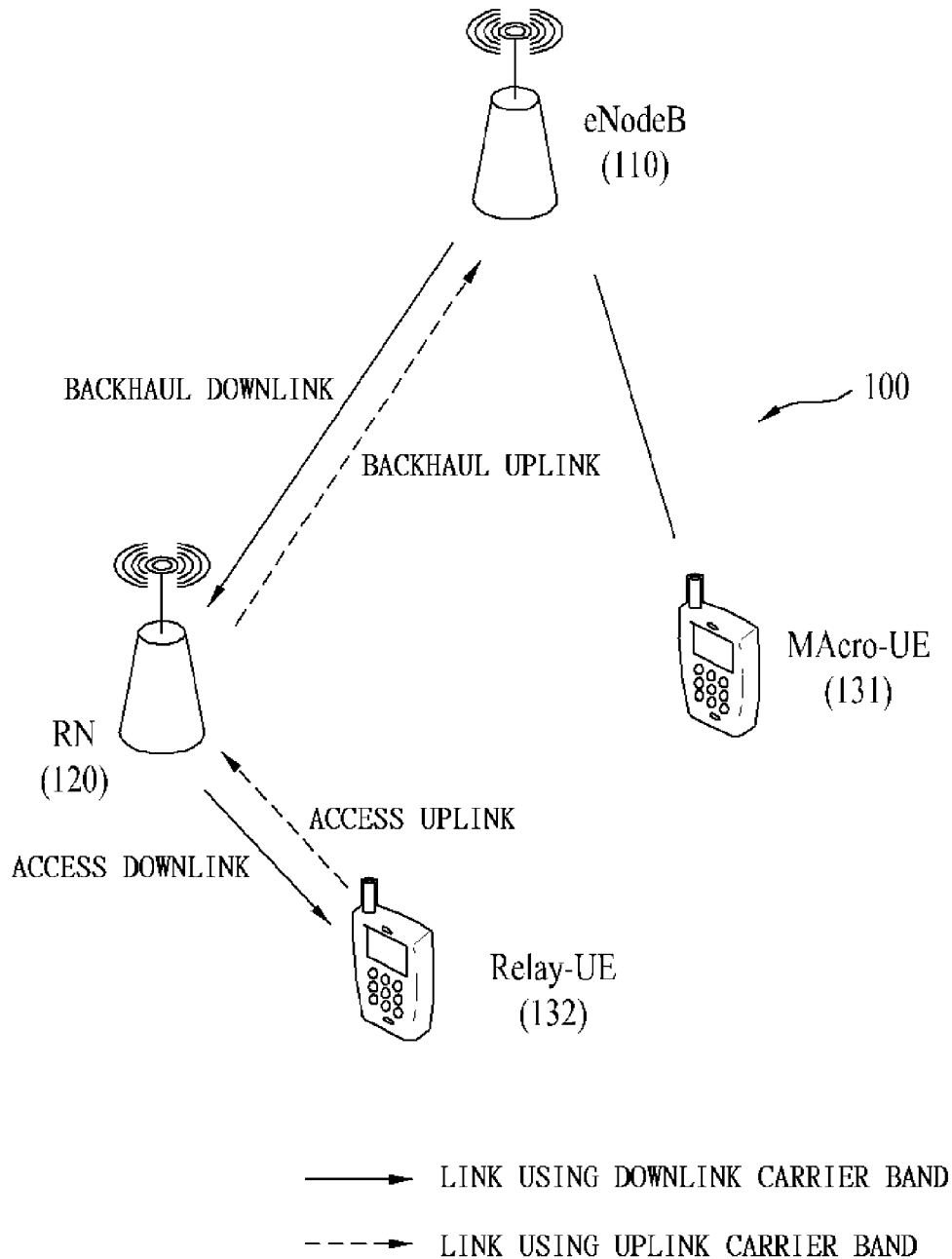
FIG. 1 is a diagram showing a radio communication system including a base station (eNodeB), a Relay Node (RN) and a User Equipment (UE).

The following embodiments are proposed by combining constituent components and characteristics of the present invention according to a predetermined format. The individual constituent components or characteristics should be considered to be optional factors on the condition that there is no additional remark. If required, the individual constituent components or characteristics may not be combined with other components or characteristics. Also, some constituent components and/or characteristics may be combined to implement the embodiments of the present invention. The order of operations to be disclosed in the embodiments of the present invention may be changed to another. Some components or characteristics of any embodiment may also be included in other embodiments, or may be replaced with those of the other embodiments as necessary.

The embodiments of the present invention are disclosed on the basis of a data communication relationship between a base station and a terminal. In this case, the base station is used as a terminal node of a network via which the base station can directly communicate with the terminal. Specific operations to be conducted by the base station in the present invention may also be conducted by an upper node of the base station as necessary.

In other words, it will be obvious to those skilled in the art that various operations for enabling the base station to communicate with the terminal in a network composed of several network nodes including the base station will be conducted by the base station or other network nodes other than the base station. The term "Base Station (BS)" may be replaced with a fixed station, Node-B, eNode-B (eNB), or an access point as necessary. The term "relay" may be replaced with a Relay Node (RN) or a Relay Station (RS). The term "terminal" may also be replaced with a User Equipment (UE), a Mobile Station (MS), a Mobile Subscriber Station (MSS) or a Subscriber Station (SS) as necessary.

It should be noted that specific terms disclosed in the present invention are proposed for the convenience of description and better understanding of the present invention, and the use of these specific terms may be changed to another format within the technical scope or spirit of the present invention.

In some instances, well-known structures and devices are omitted in order to avoid obscuring the concepts of the present invention and the important functions of the structures and devices are shown in block diagram form. The same reference numbers will be used throughout the drawings to refer to the same or like parts.

Exemplary embodiments of the present invention are supported by standard documents disclosed for at least one of wireless access systems including an Institute of Electrical and Electronics Engineers (IEEE) 802 system, a 3rd Generation Project Partnership (3GPP) system, a 3GPP Long Term Evolution (LTE) system, and a 3GPP2 system. In particular, the steps or parts, which are not described to clearly reveal the technical idea of the present invention, in the embodiments of the present invention may be supported by the above documents. All terminology used herein may be supported by at least one of the above-mentioned documents.

The following embodiments of the present invention can be applied to a variety of wireless access technologies, for example, CDMA (Code Division Multiple Access), FDMA (Frequency Division Multiple Access), TDMA (Time Division Multiple Access), OFDMA (Orthogonal Frequency Division Multiple Access), SC-FDMA (Single Carrier Frequency Division Multiple Access), and the like. The CDMA may be embodied with wireless (or radio) technology such as UTRA (Universal Terrestrial Radio Access) or CDMA2000. The TDMA may be embodied with wireless (or radio) technology such as GSM (Global System for Mobile communications)/GPRS (General Packet Radio Service)/EDGE (Enhanced Data Rates for GSM Evolution). The OFDMA may be embodied with wireless (or radio) technology such as Institute of Electrical and Electronics Engineers (IEEE) 802.11 (Wi-Fi), IEEE 802.16 (WiMAX), IEEE 802-20, and E-UTRA (Evolved UTRA). The UTRA is a part of the UMTS (Universal Mobile Telecommunications System). The 3GPP (3rd Generation Partnership Project) LTE (long term evolution) is a part of the E-UMTS (Evolved UMTS), which uses E-UTRA. The 3GPP LTE employs the OFDMA in downlink and employs the SC-FDMA in uplink. The LTE-Advanced (LTE-A) is an evolved version of the 3GPP LTE. WiMAX can be explained by an IEEE 802.16e (WirelessMAN-OFDMA Reference System) and an advanced IEEE 802.16m (WirelessMAN-OFDMA Advanced System). For clarity, the following description focuses on the 3GPP LTE and 3GPP LTE-A system. However, technical features of the present invention are not limited thereto.

Figure 2:
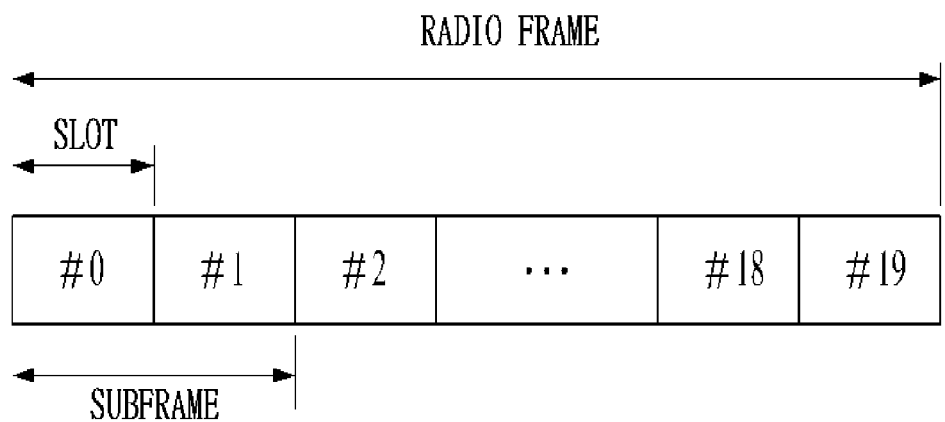
FIG. 2 is a diagram showing the structure of a radio frame used in a 3rd Generation Partnership Project Long Term Evolution (3GPP LTE) system.

FIG. 2 is a diagram showing the structure of a radio frame used in a 3rd Generation Partnership Project Long Term Evolution (3GPP LTE) system. One radio frame includes 10 subframes, and one subframe includes two slots in a time domain. A time for transmitting one subframe is defined in a Transmission Time Interval (TTI). For example, one subframe may have a length of 1 ms and one slot may have a length of 0.5 ms. One slot may include a plurality of OFDM symbols in a time domain. Since the 3GPP LTE system uses an OFDMA scheme in downlink, the OFDM symbol indicates one symbol period. One symbol may be called a SC-FDMA symbol or a symbol period in uplink. A Resource Block (RB) is a resource allocation unit and includes a plurality of consecutive carriers in one slot. The above structure of the radio frame is only exemplary. Accordingly, the number of subframes included in one radio frame, the number of slots included in one subframe or the number of OFDM symbols included in one slot may be changed in various manners.

Figure 3:
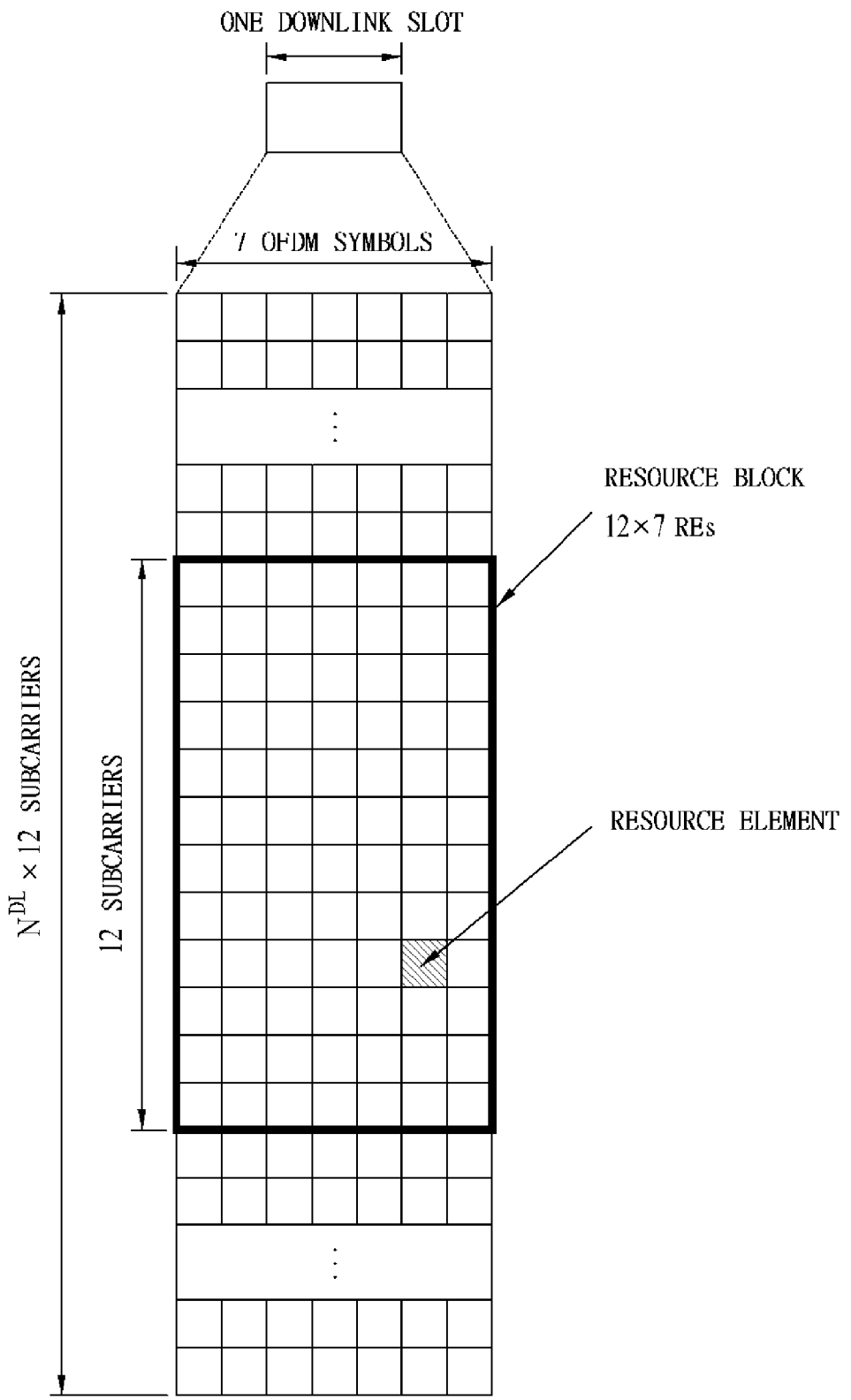
FIG. 3 is a diagram showing a resource grid in a downlink slot.

FIG. 3 is a diagram showing a resource grid in a downlink slot. Although one downlink slot includes seven OFDM symbols in a time domain and one RB includes 12 subcarriers in a frequency domain in the figure, the present invention is not limited thereto. For example, in case of a normal Cyclic Prefix (CP), one slot includes 7 OFDM symbols. However, in case of an extended CP, one slot includes 6 OFDM symbols. Each element on the resource grid is referred to as a resource element. One RB includes 12×7 resource elements. The number NDL of RBs included in the downlink slot is determined based on a downlink transmission bandwidth. The structure of the uplink slot may be equal to the structure of the downlink slot.

Figure 4:
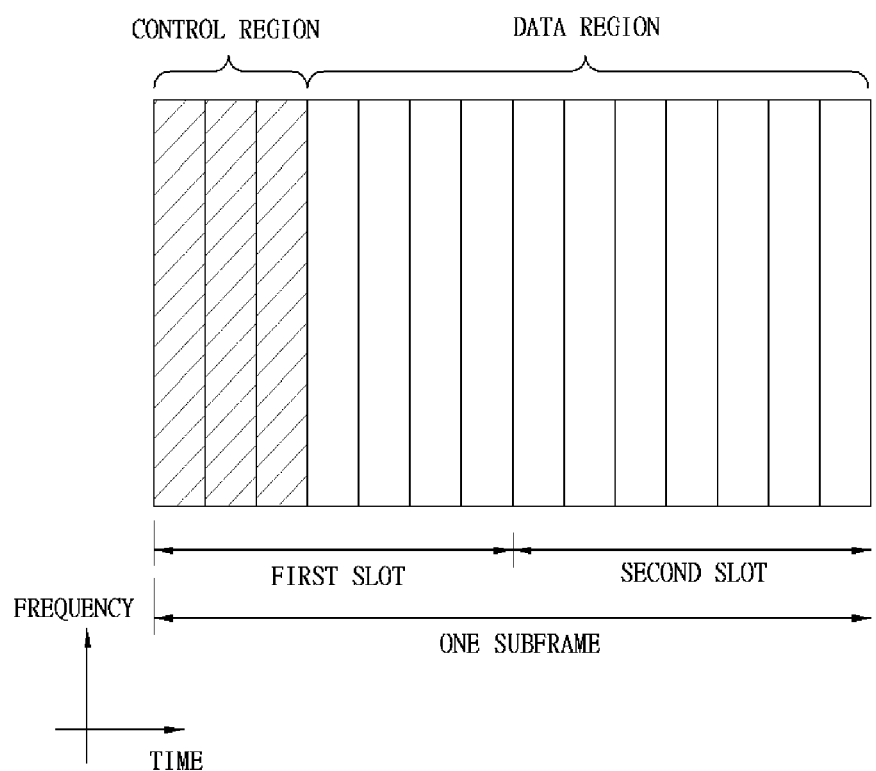
FIG. 4 is a diagram showing the structure of a downlink subframe.

FIG. 4 is a diagram showing the structure of a downlink subframe. A maximum of three OFDM symbols of a front portion of a first slot within one subframe corresponds to a control region to which a control channel is allocated. The remaining OFDM symbols correspond to a data region to which a Physical Downlink Shared Channel (PDSCH) is allocated. Examples of the downlink control channels used in the 3GPP LTE system include, for example, a Physical Control Format Indicator Channel (PCFICH), a Physical Downlink Control Channel (PDCCH), a Physical Hybrid automatic repeat request Indicator Channel (PHICH), etc. The PCFICH is transmitted at a first OFDM symbol of a subframe, and includes information about the number of OFDM symbols used to transmit the control channel in the subframe. The PHICH includes a HARQ ACK/NACK signal as a response of uplink transmission. The control information transmitted through the PDCCH is referred to as Downlink Control Information (DCI). The DCI includes uplink or downlink scheduling information or an uplink transmit power control command for a certain UE group. The PDCCH may include resource allocation and transmission format of a Downlink Shared Channel (DL-SCH), resource allocation information of an Uplink Shared Channel (UL-SCH), paging information of a Paging Channel (PCH), system information on the DL-SCH, resource allocation of an higher layer control message such as a Random Access Response (RAR) transmitted on the PDSCH, a set of transmit power control commands for an individual UEs in a certain UE group, transmit power control information, activation of Voice over IP (VoIP), etc. A plurality of PDCCHs may be transmitted within the control region. The UE may monitor the plurality of PDCCHs. The PDCCHs are transmitted on an aggregation of one or several consecutive control channel elements (CCEs). The CCE is a logical allocation unit used to provide the PDCCHs at a coding rate based on the state of a radio channel. The CCE corresponds to a plurality of resource element groups. The format of the PDCCH and the number of available bits are determined based on a correlation between the number of CCEs and the coding rate provided by the CCEs. The base station determines a PDCCH format according to a DCI to be transmitted to the UE, and attaches a Cyclic Redundancy Check (CRC) to control information. The CRC is masked with a Radio Network Temporary Identifier (RNTI) according to an owner or usage of the PDCCH. If the PDCCH is for a specific UE, a cell-RNTI (C-RNTI) of the UE may be masked to the CRC. Alternatively, if the PDCCH is for a paging message, a paging indicator identifier (P-RNTI) may be masked to the CRC. If the PDCCH is for system information (more specifically, a system information block (SIB)), a system information identifier and a system information RNTI (SI-RNTI) may be masked to the CRC. To indicate a random access response that is a response for transmission of a random access preamble of the UE, a random access-RNTI (RA-RNTI) may be masked to the CRC.

Figure 5:
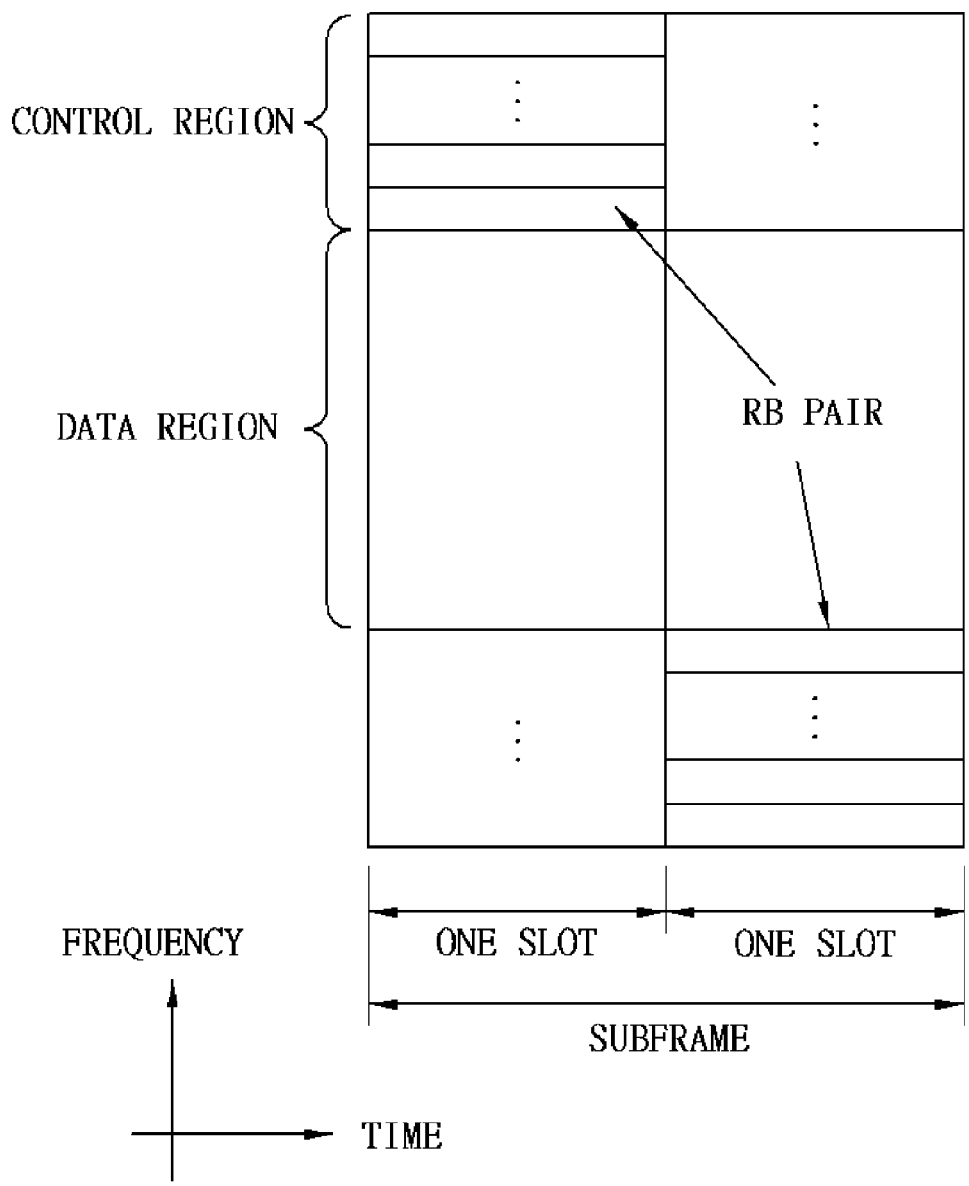
FIG. 5 is a diagram showing the structure of an uplink subframe.

FIG. 5 is a diagram showing the structure of an uplink frame. The uplink subframe may be divided into a control region and a data region in a frequency domain. A Physical Uplink Control Channel (PUCCH) including uplink control information is allocated to the control region. A Physical uplink Shared Channel (PUSCH) including user data is allocated to the data region. In order to maintain single carrier property, one UE does not simultaneously transmit the PUCCH and the PUSCH. The PUCCH for one UE is allocated to a RB pair in a subframe. RBs belonging to the RB pair occupy different subcarriers with respect to two slots. Thus, the RB pair allocated to the PUCCH is "frequency-hopped" at a slot boundary.

Modeling of Multi-Input Multi-Output (MIMO) System

Figure 6:
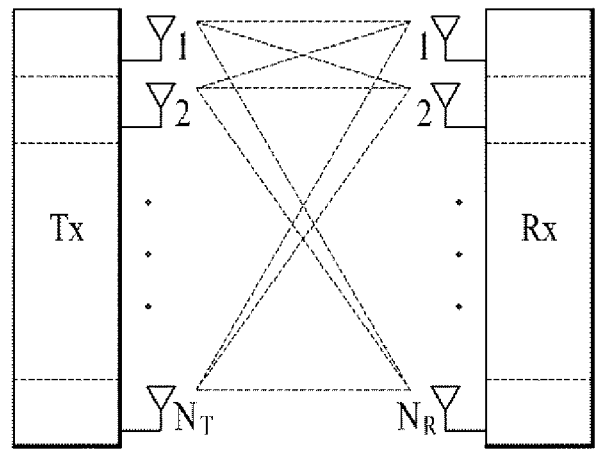
FIG. 6 is a diagram showing the configuration of a radio communication system having multiple antennas.
Figure 6:
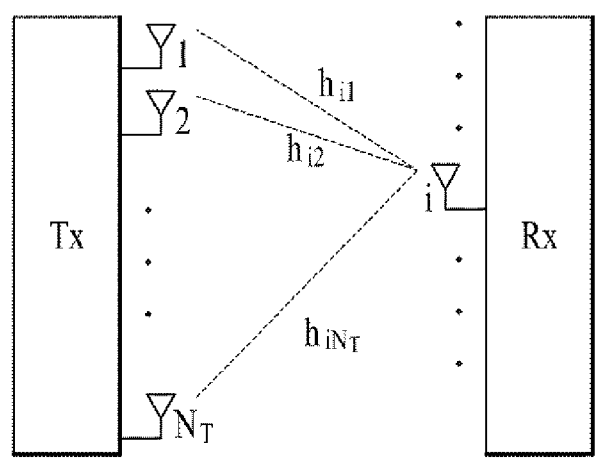

FIG. 6 is a diagram showing the configuration of a radio communication system having multiple antennas.

As shown in FIG. 6(a), if the number of transmission antennas is increased to $N_T$ and the number of reception antennas is increased to $N_R$, a theoretical channel transmission capacity is increased in proportion to the number of antennas, unlike the case where a plurality of antennas is used in only a transmitter or a receiver. Accordingly, it is possible to improve a transfer rate and to remarkably improve frequency efficiency. As the channel transmission capacity is increased, the transfer rate may be theoretically increased by a product of a maximum transfer rate $R_0$ upon using a single antenna and a rate increase ratio $R_i$.

MathFigure 1

$$R_i = \min(N_T, N_R) \quad [\text{Math.1}]$$

For example, in an MIMO system using four transmission antennas and four reception antennas, it is possible to theoretically acquire a transfer rate which is four times that of a single antenna system. After the increase in the theoretical capacity of the MIMO system was proved in the mid-1990s, various technologies of substantially improving a data transfer rate have been actively developed up to now. In addition, several technologies are already applied to the various radio communication standards such as the third-generation mobile communication and the next-generation wireless local area network (LAN).

According to the researches into the MIMO antenna up to now, various researches such as researches into information theory related to the computation of the communication capacity of a MIMO antenna in various channel environments and multiple access environments, researches into the model and the measurement of the radio channels of the MIMO system, and researches into space-time signal processing technologies of improving transmission reliability and transmission rate have been actively conducted.

The communication method of the MIMO system will be described in more detail using mathematical modeling. In the above system, it is assumed that $N_T$ transmission antennas and $N_R$ reception antennas are present.

In transmitted signals, if the $N_T$ transmission antennas are present, the number of pieces of maximally transmittable information is $N_T$. The transmitted information may be expressed as follows.

MathFigure 2

$$s = [s_1, s_2, \ldots, s_{N_T}]^T \quad [\text{Math.2}]$$

The transmitted information $s_1, s_2, \ldots, s_{N_T}$ may have different transmit powers. If the respective transmit powers are $P_1, P_2, \ldots, P_{N_T}$, the transmitted information with adjusted powers may be expressed as follows.

MathFigure 3

$$\hat{s} = [\hat{s}_1, \hat{s}_2, \ldots, \hat{s}_{N_T}]^T = [P_1 s_1, P_2 s_2, \ldots, P_{N_T} s_{N_T}]^T \quad [\text{Math.3}]$$

In addition, $\hat{s}$ may be expressed using a diagonal matrix $P$ of the transmit powers as follows.

Math Figure 4

$$\hat{s} = \begin{bmatrix} P_1 & & & 0 \\ & P_2 & & \\ & & \ddots & \\ 0 & & & P_{N_T} \end{bmatrix} \begin{bmatrix} s_1 \\ s_2 \\ \vdots \\ s_{N_T} \end{bmatrix} = Ps \quad [\text{Math. 4}]$$

Consider that the $N_T$ actually transmitted signals $x_1, x_2, \ldots, x_{N_T}$ are configured by applying a weight matrix $W$ to the information vector $\hat{s}$ with the adjusted transmit powers. The weight matrix $W$ serves to appropriately distribute the transmitted information to each antenna according to a transport channel state, etc. $x_1, x_2, \ldots, x_{N_T}$ may be expressed by using the vector $x$ as follows.

Math Figure 5

$$x = \begin{bmatrix} x_1 \\ x_2 \\ \vdots \\ x_i \\ \vdots \\ x_{N_T} \end{bmatrix} = \begin{bmatrix} w_{11} & w_{12} & \cdots & w_{1N_T} \\ w_{21} & w_{22} & \cdots & w_{2N_T} \\ \vdots & & \ddots & \vdots \\ w_{i1} & w_{i2} & \cdots & w_{iN_T} \\ \vdots & & \ddots & \vdots \\ w_{N_T 1} & w_{N_T 2} & \cdots & w_{N_T N_T} \end{bmatrix} \begin{bmatrix} \hat{s}_1 \\ \hat{s}_2 \\ \vdots \\ \hat{s}_j \\ \vdots \\ \hat{s}_{N_T} \end{bmatrix} = W\hat{s} = WPs \quad [\text{Math. 5}]$$

where, $w_{ij}$ denotes a weight between an i-th transmission antenna and j-th information. $W$ is also called a precoding matrix.

In received signals, if the $N_R$ reception antennas are present, respective received signals $y_1, y_2, \ldots, y_{N_R}$ of the antennas are expressed as follows.

MathFigure 6

$$y = [y_1, y_2, \ldots, y_{N_R}]^T \quad [\text{Math.6}]$$

If channels are modeled in the MIMO radio communication system, the channels may be distinguished according to transmission/reception antenna indexes. A channel from the transmission antenna j to the reception antenna i is denoted by $h_{ij}$.

In $h_{ij}$, it is noted that the indexes of the reception antennas precede the indexes of the transmission antennas in view of the order of indexes.

FIG. 6(b) is a diagram showing channels from the $N_T$ transmission antennas to the reception antenna i. The channels may be combined and expressed in the form of a vector and a matrix. In FIG. 6(b), the channels from the $N_T$ transmission antennas to the reception antenna i may be expressed as follows.

MathFigure 7

$$h_i^T = [h_{i1}, h_{i2}, \ldots, h_{iN_T}] \quad [\text{Math.7}]$$

Accordingly, all the channels from the $N_T$ transmission antennas to the $N_R$ reception antennas may be expressed as follows.

Figure 8:
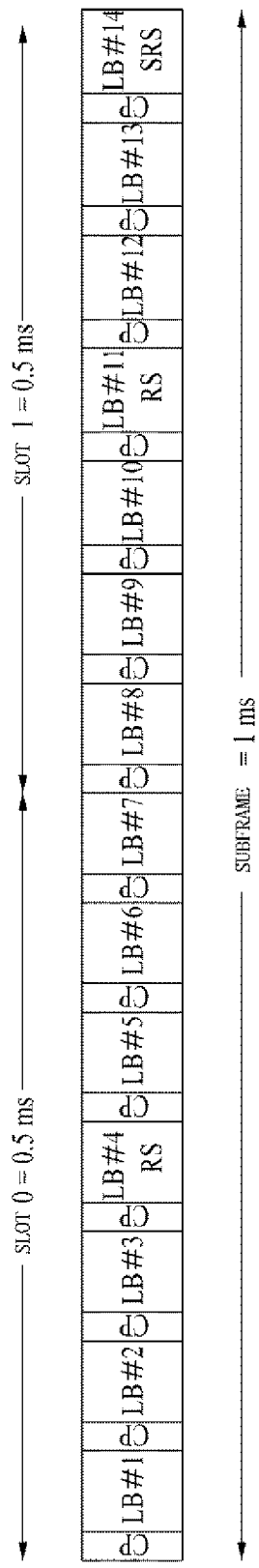
FIG. 8 is a diagram illustrating transmission of a reference signal in an uplink subframe.

Math Figure 8

$$H = \begin{bmatrix} h_1^T \\ h_2^T \\ \vdots \\ h_i^T \\ \vdots \\ h_{N_R}^T \end{bmatrix} = \begin{bmatrix} h_{11} & h_{12} & \cdots & h_{1N_T} \\ h_{21} & h_{22} & \cdots & h_{2N_T} \\ \vdots & & \ddots & \\ h_{i1} & h_{i2} & \cdots & h_{iN_T} \\ \vdots & & \ddots & \\ h_{N_R1} & h_{N_R2} & \cdots & h_{N_RN_T} \end{bmatrix} \quad [\text{Math. 8}]$$

An Additive White Gaussian Noise (AWGN) is added to the actual channels after a channel matrix
H.
The AWGN
$n_1, n_2, \ldots, n_{N_R}$
added to the $N_T$ transmission antennas may be expressed as follows.

MathFigure 9

$$n = [n_1, n_2, \ldots, n_{N_R}]^T \quad [\text{Math.9}]$$

Through the above-described mathematical modeling, the received signals may be expressed as follows.

Figure 10:
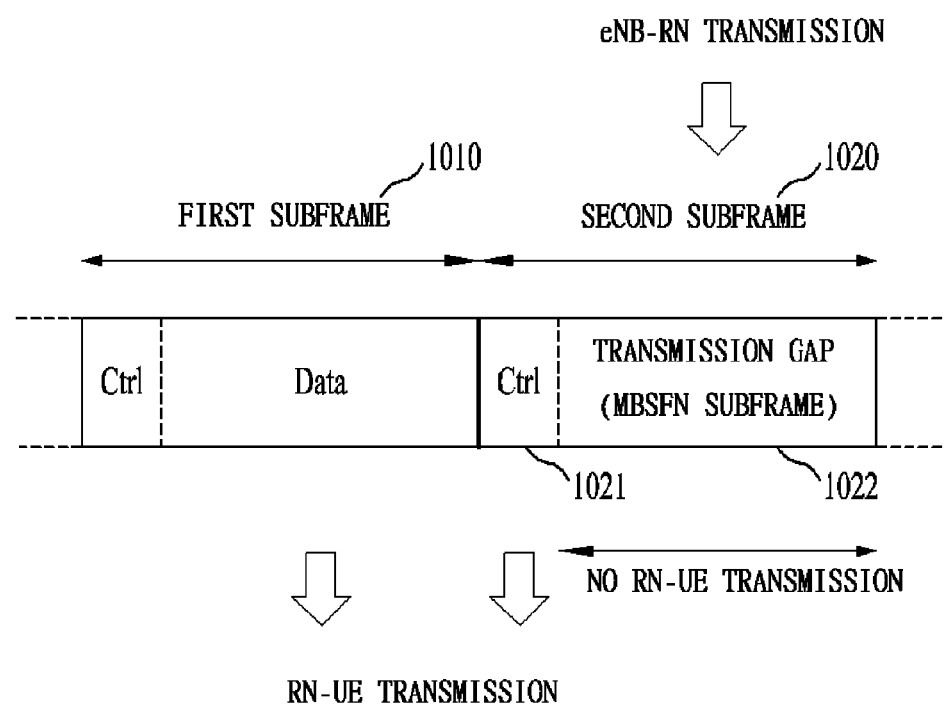
FIG. 10 is a diagram showing an example of relay resource partitioning.

Math Figure 10

$$y = \begin{bmatrix} y_1 \\ y_2 \\ \vdots \\ y_i \\ \vdots \\ y_{N_R} \end{bmatrix} = \begin{bmatrix} h_{11} & h_{12} & \cdots & h_{1N_T} \\ h_{21} & h_{22} & \cdots & h_{2N_T} \\ \vdots & & \ddots & \\ h_{i1} & h_{i2} & \cdots & h_{iN_T} \\ \vdots & & \ddots & \\ h_{N_R1} & h_{N_R2} & \cdots & h_{N_RN_T} \end{bmatrix} \begin{bmatrix} x_1 \\ x_2 \\ \vdots \\ x_j \\ \vdots \\ x_{N_T} \end{bmatrix} + \begin{bmatrix} n_1 \\ n_2 \\ \vdots \\ n_i \\ \vdots \\ n_{N_R} \end{bmatrix} = \quad [\text{Math. 10}]$$

$$Hx + n$$

The number of rows and columns of the channel matrix
H
indicating the channel state is determined by the number of transmission and reception antennas. The number of rows of the channel matrix
H
is equal to the number $N_R$ of reception antennas and the number of columns thereof is equal to the number $N_T$ of transmission antennas. That is, the channel matrix
H
is an $N_R \times N_T$ matrix.
The rank of the matrix is defined by the smaller of the number of rows or columns, which is independent from each other. Accordingly, the rank of the matrix is not greater than the number of rows or columns. The rank
rank (H)
of the channel matrix
H
is restricted as follows.

MathFigure 11

$$\text{rank}(H) \leq \min(N_T, N_R) \quad [\text{Math.11}]$$

When the matrix is subjected to Eigen value decomposition, the rank may be defined by the number of Eigen values excluding 0. Similarly, when the matrix is subjected to singular value decomposition, the rank may be defined by the number of singular values excluding 0. Accordingly, the physical meaning of the rank in the channel matrix may be a maximum number of different transmittable information in a given channel.

Reference Signal (RS)

In a radio communication system, since packets are transmitted through a radio channel, a signal may be distorted during transmission. In order to enable a reception side to correctly receive the distorted signal, distortion of the received signal should be corrected using channel information. In order to detect the channel information, a method of transmitting a signal, of which both the transmission side and the reception side are aware, and detecting channel information using a distortion degree when the signal is received through a channel is mainly used. The above signal is referred to as a pilot signal or a reference signal (RS).

When transmitting and receiving data using multiple antennas, the channel states between the transmission antennas and the reception antennas should be detected in order to correctly receive the signal. Accordingly, each transmission antenna has an individual RS.

A downlink RS includes a Common RS (CRS) shared among all UEs in a cell and a Dedicated RS (DRS) for only a specific-UE. It is possible to provide information for channel estimation and demodulation using such RSs.

The reception side (UE) estimates the channel state from the CRS and feeds back an indicator associated with channel quality, such as a Channel Quality Indicator (CQI), a Precoding Matrix Index (PMI) and/or a Rank Indicator (RI), to the transmission side (eNodeB). The CRS may be called a cell-specific RS. Alternatively, an RS associated with the feedback of Channel State Information (CSI) such as CQI/PMI/RI may be separately defined as a CSI-RS.

The DRS may be transmitted through REs if data demodulation on a PDSCH is necessary. The UE may receive the presence/absence of the DRS from a higher layer and receive information indicating that the DRS is valid only when the PDSCH is mapped. The DRS may be also called a UE-specific RS or a Demodulation RS (DMRS).

Figure 7:
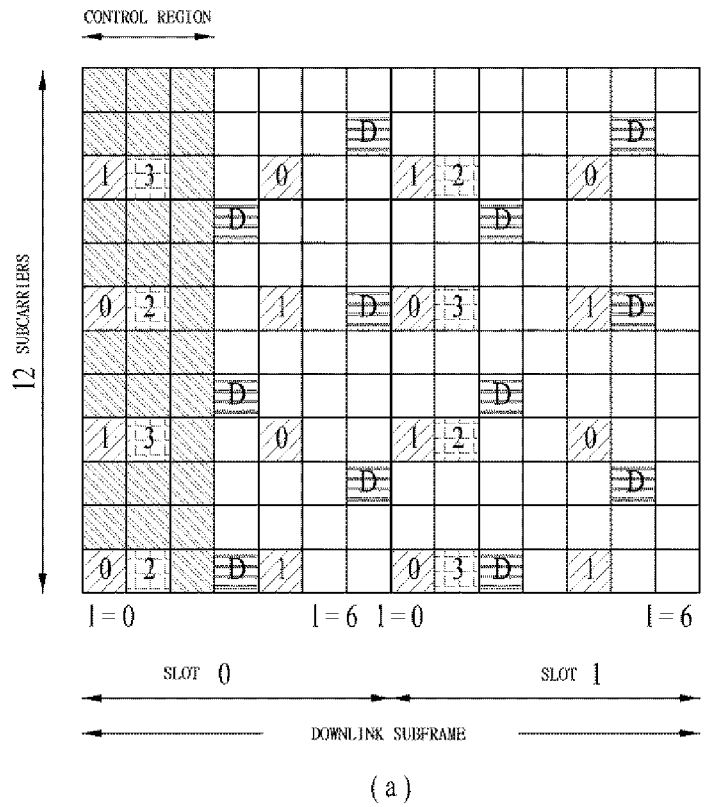
FIG. 7 is a diagram showing a downlink reference signal pattern defined in the 3GPP LTE system.
Figure 7:
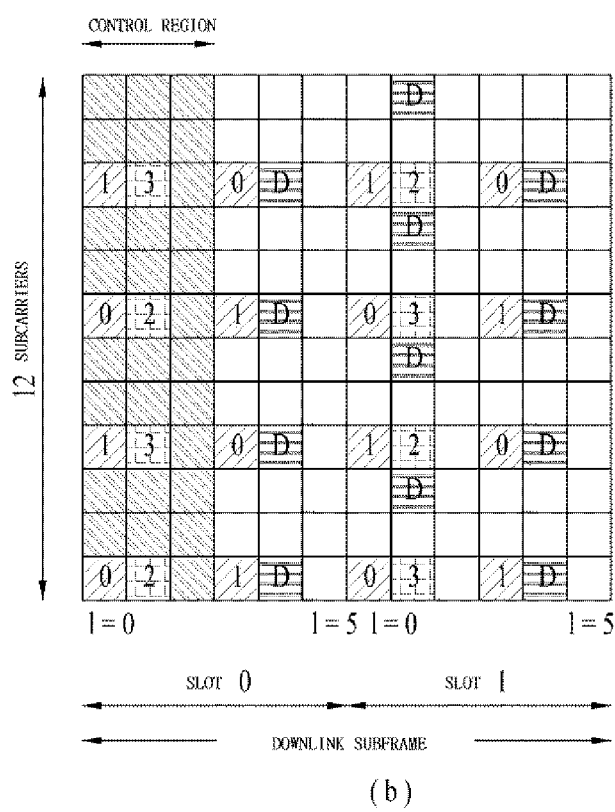

FIG. 7 is a diagram showing a pattern of CRSs and DRSs mapped on a downlink RB defined in the existing 3GPP LTE system (e.g., Release-8). The downlink RB as a mapping unit of the RSs may be expressed in units of one subframe on a time domain×12 subcarriers on a frequency domain. That is, on the time axis, one RB has a length of 14 OFDM symbols in case of the normal CP (FIG. 7(a)) and has a length of 12 OFDM symbols in case of the extended CP (FIG. 7(b)).

FIG. 7 shows the locations of the RSs on the RB in the system in which the eNodeB supports four transmission antennas. In FIG. 7, Resource Elements (REs) denoted by "0", "1", "2" and "3" indicate the locations of the CRSs of the antenna port indexes 0, 1, 2 and 3, respectively. In FIG. 7, the RE denoted by "D" indicates the location of the DRS.

Hereinafter, the CRS will be described in detail.

The CRS is used to estimate the channel of a physical antenna and is distributed over the entire band as an RS which is able to be commonly received by all UEs located within a cell. The CRS may be used for CSI acquisition and data demodulation.

The CRS is defined in various formats according to the antenna configuration of the transmission side (eNodeB). The 3GPP LTE (e.g., Release-8) system supports various antenna configurations, and a downlink signal transmission side (eNodeB) has three antenna configurations such as a single antenna, two transmission antennas and four transmission antennas. If the eNodeB performs single-antenna transmission, RSs for a single antenna port are arranged. If the eNodeB performs two-antenna transmission, RSs for two antenna ports are arranged using a Time Division Multiplexing (TDM) and/or Frequency Division Multiplexing (FDM) scheme. That is, the RSs for the two antenna ports are arranged in different time resources and/or different frequency resources so as to be distinguished from each other. In addition, if the eNodeB performs four-antenna transmission, RSs for four antenna ports are arranged using the TDM/FDM scheme. The channel information estimated by the downlink signal reception side (UE) through the CRSs may be used to demodulate data transmitted using a transmission scheme such as single antenna transmission, transmit diversity, closed-loop spatial multiplexing, open-loop spatial multiplexing, or Multi-User MIMO (MU-MIMO).

If multiple antennas are supported, when RSs are transmitted from a certain antenna port, the RSs are transmitted at the locations of the REs specified according to the RS pattern and any signal is not transmitted at the locations of the REs specified for another antenna port.

The rule of mapping the CRSs to the RBs is defined by Equation 12.

Figure 12:
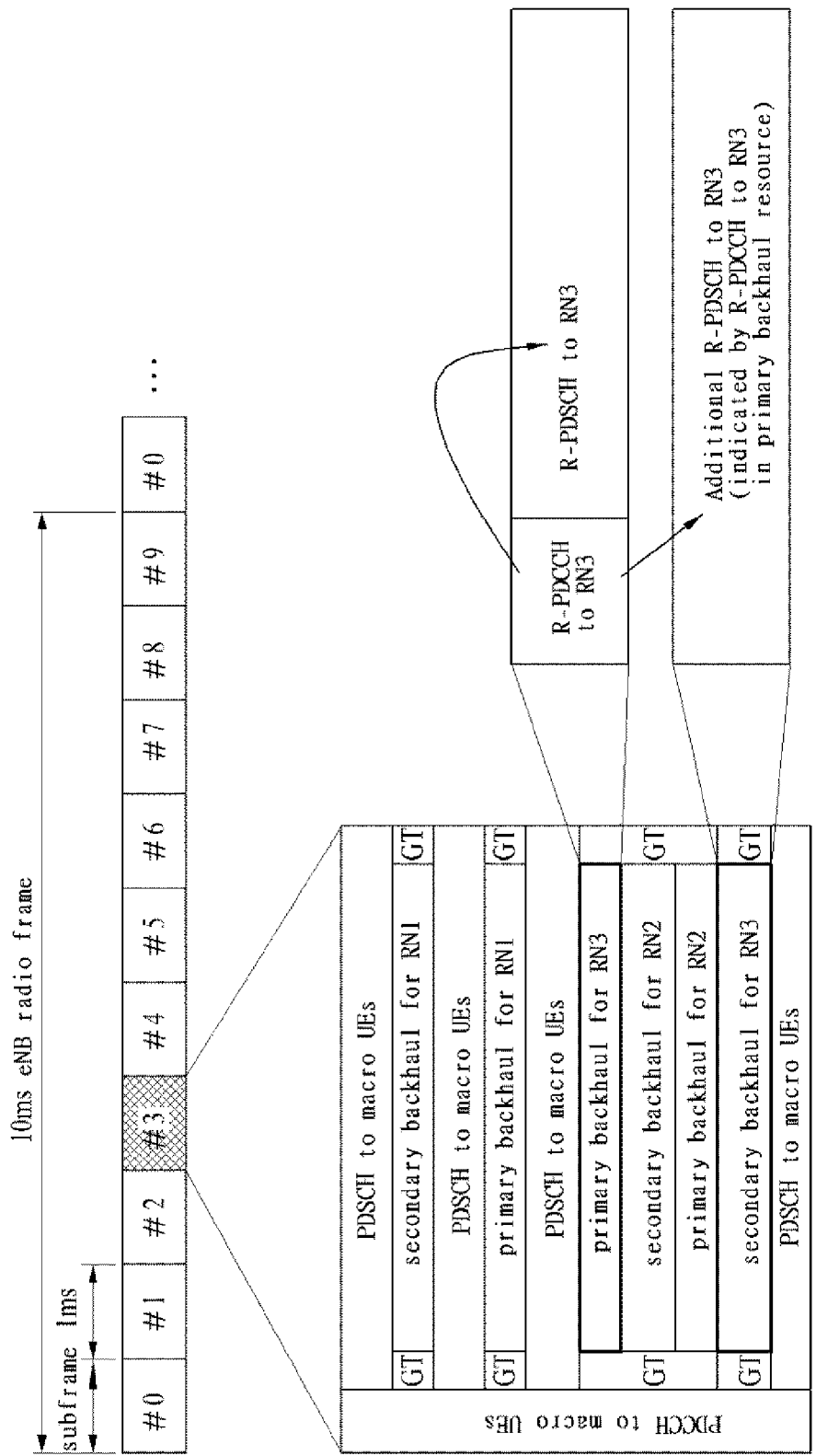
FIG. 12 is a diagram showing a subframe channel structure allocated to a downlink backhaul link.

Math Figure 12

$$k = 6m + (v + v_{shift}) \bmod 6 \quad \text{[Math. 12]}$$
$$l = \begin{cases} 0, N_{symb}^{DL} - 3 & \text{if } p \in \{0, 1\} \\ 1 & \text{if } p \in \{2, 3\} \end{cases}$$
$$m = 0, 1, \ldots, 2 \cdot N_{RB}^{DL} - 1$$
$$m' = m + N_{RB}^{max,DL} - N_{RB}^{DL}$$
$$v = \begin{cases} 0 & \text{if } p = 0 \text{ and } l = 0 \\ 3 & \text{if } p = 0 \text{ and } l \neq 0 \\ 3 & \text{if } p = 1 \text{ and } l = 0 \\ 0 & \text{if } p = 1 \text{ and } l \neq 0 \\ 3(n_s \bmod 2) & \text{if } p = 2 \\ 3 + 3(n_s \bmod 2) & \text{if } p = 3 \end{cases}$$
$$v_{shift} = N_{ID}^{cell} \bmod 6$$

In Equation 12, k denotes a subcarrier index, l denotes a symbol index, and p denotes an antenna port index.

$N_{symb}^{DL}$ denotes the number of OFDM symbols of one downlink slot, $N_{RB}^{DL}$ denotes the number of RBs allocated to the downlink, $n_s$ denotes a slot index, and $N_{ID}^{cell}$ denotes a cell ID. mod indicates a modulo operation. The location of the RS in the frequency domain depends on a value $V_{shift}$. Since the value $V_{shift}$ depends on the cell ID, the location of the RS has a frequency shift value which varies according to the cell.

In detail, in order to increase channel estimation performance through the CRSs, the locations of the CRSs in the frequency domain may be shifted so as to be changed according to the cells. For example, if the RSs are located at an interval of three sub-carriers, the RSs are arranged on 3k-th subcarriers in one cell and arranged on (3k+1)-th subcarriers in the other cell. In view of one antenna port, the RSs are arranged at an interval of 6 REs (that is, interval of 6 subcarriers) in the frequency domain and are separated from REs, on which RSs allocated to another antenna port are arranged, by 3 REs in the frequency domain.

In addition, power boosting is applied to the CRSs. The power boosting indicates that the RSs are transmitted using higher power by bringing (stealing) the powers of the REs except for the REs allocated for the RSs among the REs of one OFDM symbol.

In the time domain, the RSs are arranged from a symbol index (l=0) of each slot as a starting point at a constant interval. The time interval is differently defined according to the CP length. The RSs are located on symbol indexes 0 and 4 of the slot in case of the normal CP and are located on symbol indexes 0 and 3 of the slot in case of the extended CP. Only RSs for a maximum of two antenna ports are defined in one OFDM symbol. Accordingly, upon four-transmission antenna transmission, the RSs for the antenna ports 0 and 1 are located on the symbol indexes 0 and 4 (the symbol indexes 0 and 3 in case of the extended CP) of the slot and the RSs for the antenna ports 2 and 3 are located on the symbol index 1 of the slot. The frequency locations of the RSs for the antenna ports 2 and 3 in the frequency domain are exchanged with each other in a second slot.

In order to support spectrum efficiency higher than that of the existing 3GPP LTE (e.g., Release-8) system, a system (e.g., an LTE-A system) having the extended antenna configuration may be designed. The extended antenna configuration may have, for example, eight transmission antennas. In the system having the extended antenna configuration, UEs which operate in the existing antenna configuration needs to be supported, that is, backward compatibility needs to be supported. Accordingly, it is necessary to support a RS pattern according to the existing antenna configuration and to design a new RS pattern for an additional antenna configuration. If CRSs for the new antenna ports are added to the system having the existing antenna configuration, RS overhead is rapidly increased and thus data transfer rate is reduced. In consideration of these problems, in an LTE-A (Advanced) system which is an evolution version of the 3GPP LTE system, separate RSs (CSI-RSs) for measuring the CSI for the new antenna ports may be used.

Hereinafter, the DRS will be described in detail.

The DRS (or the UE-specific RS) is used to demodulate data. A precoding weight used for a specific UE upon multi-antenna transmission is also used in an RS without change so as to estimate an equivalent channel, in which a transfer channel and the precoding weight transmitted from each transmission antenna are combined, when the UE receives the RSs.

The existing 3GPP LTE system (e.g., Release-8) supports four-transmission antenna transmission as a maximum and the DRS for Rank 1 beamforming is defined. The DRS for Rank 1 beamforming is also denoted by the RS for the antenna port index 5. The rule of the DRS mapped on the RBs is defined by Equations 13 and 14. Equation 13 is for the normal CP and Equation 14 is for the extended CP.

Figure 13:
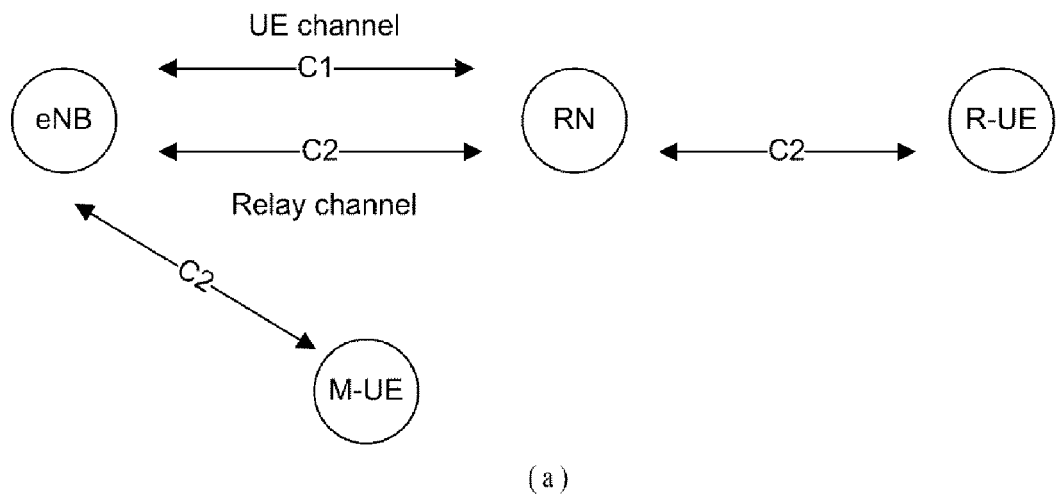
FIG. 13 is a diagram showing an example of the configuration of a backhaul link and an access link.
Figure 13:
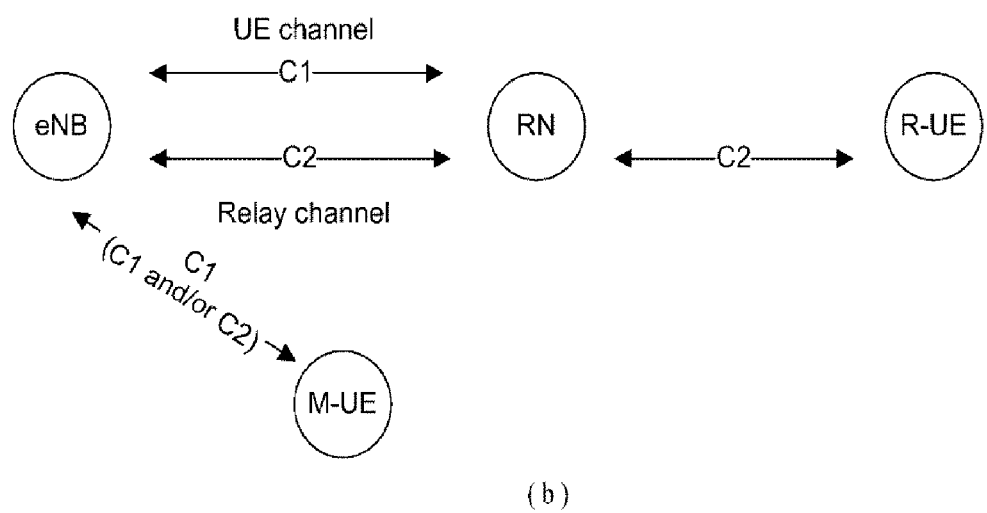

Math Figure 13

$$k = (k') \bmod N_{sc}^{RB} + N_{sc}^{RB} \cdot n_{PRB} \quad \text{[Math. 13]}$$

$$k' = \begin{cases} 4m' + v_{shift} & \text{if } l \in \{2, 3\} \\ 4m' + (2 + v_{shift}) \bmod 4 & \text{if } l \in \{5, 6\} \end{cases}$$

$$l = \begin{cases} 3 & l' = 0 \\ 6 & l' = 1 \\ 2 & l' = 2 \\ 5 & l' = 3 \end{cases}$$

$$l' = \begin{cases} 0, 1 & \text{if } n_s \bmod 2 = 0 \\ 2, 3 & \text{if } n_s \bmod 2 = 1 \end{cases}$$

$$m' = 0, 1, \ldots, 3N_{RB}^{PDSCH} - 1$$

$$v_{shift} = N_{ID}^{cell} \bmod 3$$

Figure 14:
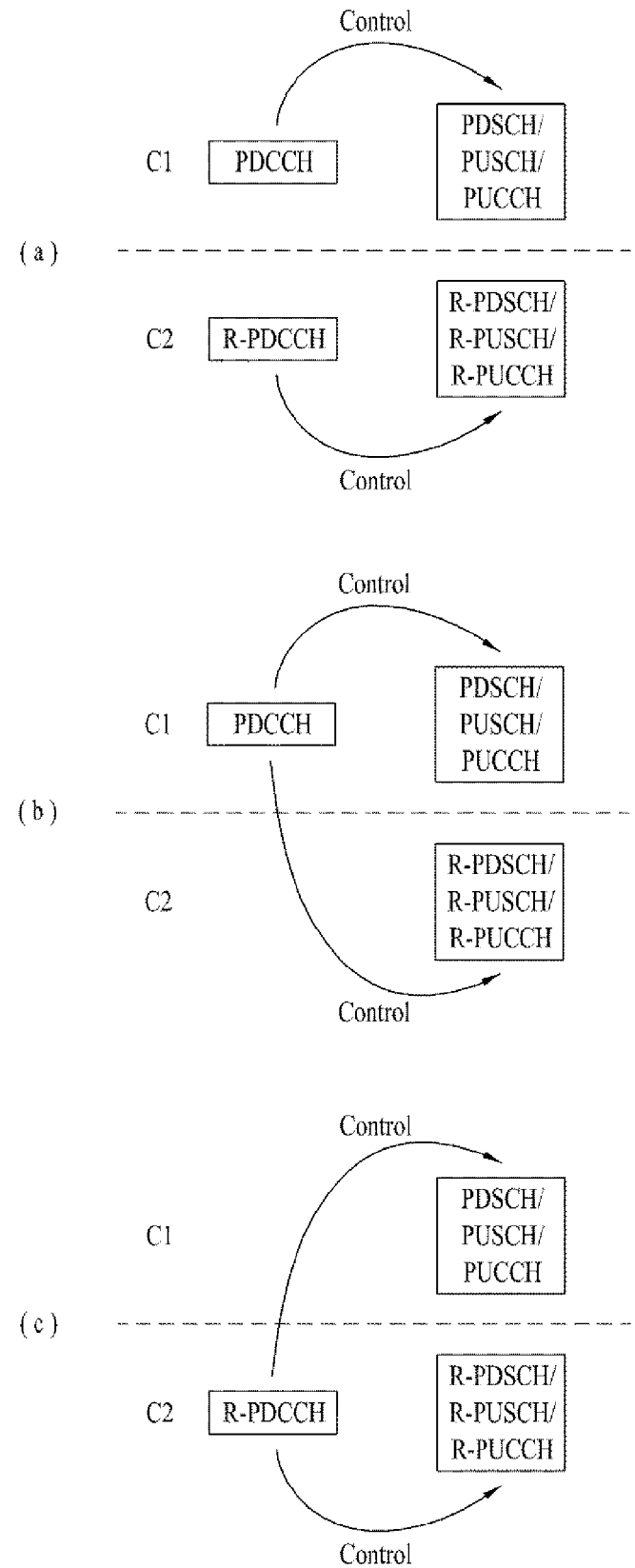
FIG. 14 is a diagram conceptually illustrating physical channel control.

Math Figure 14

$$k = (k') \bmod N_{sc}^{RB} + N_{sc}^{RB} \cdot n_{PRB} \quad \text{[Math. 14]}$$

$$k' = \begin{cases} 3m' + v_{shift} & \text{if } l = 4 \\ 3m' + (2 + v_{shift}) \bmod 3 & \text{if } l = 1 \end{cases}$$

$$l = \begin{cases} 4 & l' \in \{0, 2\} \\ 1 & l' = 1 \end{cases}$$

$$l' = \begin{cases} 0 & \text{if } n_s \bmod 2 = 0 \\ 1, 2 & \text{if } n_s \bmod 2 = 1 \end{cases}$$

$$m' = 0, 1, \ldots, 4N_{RB}^{PDSCH} - 1$$

$$v_{shift} = N_{ID}^{cell} \bmod 3$$

In Equations 13 and 14, k denotes a subcarrier index, l denotes a symbol index, and p denotes an antenna port index.

$N_{SC}^{RB}$ denotes the resource block size in the frequency domain and is expressed by the number of subcarriers.

$n_{PRB}$ denotes a physical resource block number.

$N_{RB}^{PDSCH}$ denotes the bandwidth of the RB of the PDSCH transmission.

$n_s$ denotes a slot index, and $N_{ID}^{cell}$ denotes a cell ID. mod indicates a modulo operation. The location of the RS in the frequency domain depends on a value $V_{shift}$. Since the value $V_{shift}$ depends on the cell ID, the location of the RS has a frequency shift value which varies according to the cell.

In the LTE-A system which is the evolution version of the 3GPP LTE system, high-order MIMO, multi-cell transmission, evolved MU-MIMO or the like is considered. In order to support efficient RS management and a developed transmission scheme, DRS-based data demodulation is considered. That is, separately from the DRS (antenna port index 5) for Rank 1 beamforming defined in the existing 3GPP LTE (e.g., Release-8) system, DRSs for two or more layers may be defined in order to support data transmission through the added antenna.

Cooperative Multi-Point (CoMP)

According to the improved system performance requirements of the 3GPP LTE-A system, CoMP transmission/reception technology (may be referred to as co-MIMO, collaborative MIMO or network MIMO) is proposed. The CoMP technology can increase the performance of the UE located on a cell edge and increase average sector throughput.

In general, in a multi-cell environment in which a frequency reuse factor is 1, the performance of the UE located on the cell edge and average sector throughput may be reduced due to Inter-Cell Interference (ICI). In order to reduce the ICI, in the existing LTE system, a method of enabling the UE located on the cell edge to have appropriate throughput and performance using a simple passive method such as Fractional Frequency Reuse (FFR) through the UE-specific power control in the environment restricted by interference is applied. However, rather than decreasing the use of frequency resources per cell, it is preferable that the ICI is reduced or the UE reuses the ICI as a desired signal. In order to accomplish the above object, a CoMP transmission scheme may be applied.

The CoMP scheme applicable to the downlink may be largely classified into a Joint Processing (JP) scheme and a Coordinated Scheduling/Beamforming (CS/CB) scheme.

In the JP scheme, each point (eNodeB) of a CoMP unit may use data. The CoMP unit refers to a set of eNodeBs used in the CoMP scheme. The JP scheme may be classified into a joint transmission scheme and a dynamic cell selection scheme.

The joint transmission scheme refers to a scheme for transmitting a PDSCH from a plurality of points (a part or the whole of the CoMP unit). That is, data transmitted to a single UE may be simultaneously transmitted from a plurality of transmission points. According to the joint transmission scheme, it is possible to coherently or non-coherently improve the quality of the received signals and to actively eliminate interference with another UE.

The dynamic cell selection scheme refers to a scheme for transmitting a PDSCH from one point (of the CoMP unit). That is, data transmitted to a single UE at a specific time is transmitted from one point and the other points in the cooperative unit at that time do not transmit data to the UE. The point for transmitting the data to the UE may be dynamically selected.

According to the CS/CB scheme, the CoMP units may cooperatively perform beamforming of data transmission to a single UE. Although only a serving cell transmits the data, user scheduling/beamforming may be determined by the coordination of the cells of the CoMP unit.

In uplink, coordinated multi-point reception refers to reception of a signal transmitted by coordination of a plurality of geographically separated points. The CoMP scheme applicable to the uplink may be classified into Joint Reception (JR) and Coordinated Scheduling/Beamforming (CS/CB).

The JR scheme indicates that a plurality of reception points receives a signal transmitted through a PUSCH, the CS/CB scheme indicates that only one point receives a PUSCH, and user scheduling/beamforming is determined by the coordination of the cells of the CoMP unit.

Sounding RS (SRS)

An SRS is used for enabling an eNodeB to measure channel quality so as to perform frequency-selective scheduling on the uplink and is not associated with uplink data and/or control information transmission. However, the present invention is not limited thereto and the SRS may be used for improved power control or supporting of various start-up functions of UEs which are not recently scheduled. Examples of the start-up functions may include, for example, initial Modulation and Coding Scheme (MCS), initial power control for data transmission, timing advance, and frequency-semi-selective scheduling (scheduling for selectively allocating frequency resources in a first slot of a subframe and pseudo-randomly hopping to another frequency in a second slot).

In addition, the SRS may be used for downlink channel quality measurement on the assumption that the radio channel is reciprocal between the uplink and downlink. This assumption is particularly valid in a Time Division Duplex (TDD) system in which the same frequency band is shared between the uplink and the downlink and is divided in the time domain.

The subframe through which the SRS is transmitted by a certain UE within the cell is indicated by cell-specific broadcast signaling. 4-bit cell-specific "srsSubframeConfiguration" parameter indicates 15 possible configurations of the subframe through which the SRS can be transmitted within each radio frame. By such configurations, it is possible to provide adjustment flexibility of SRS overhead according to a network arrangement scenario. The remaining one (sixteenth) configuration of the parameters indicates the switch-off of the SRS transmission within the cell and is suitable for a serving cell for serving high-rate UEs.

As shown in FIG. 8, the SRS is always transmitted on a last SC-FDMA symbol of the configured subframe. Accordingly, the SRS and a Demodulation RS (DMRS) are located on different SC-FDMA symbols. PUSCH data transmission is not allowed on the SC-FDMA symbol specified for SRS transmission and thus sounding overhead does not approximately exceed 7% even when it is highest (that is, even when SRS transmission symbols are present in all subframes).

Each SRS symbol is generated by the basic sequence (random sequence or Zadoff-Ch (ZC)-based sequence set) with respect to a given time unit and frequency band, and all UEs within the cell use the same basic sequence. At this time, the SRS transmission of the plurality of UEs within the cell in the same time unit and the same frequency band is orthogonally distinguished by different cyclic shifts of the base sequence allocated to the plurality of UEs. The SRS sequences of different cells can be distinguished by allocating different basic sequences to respective cells, but the orthogonality between the different basic sequences is not guaranteed.

Relay Node (RN)

The RN may be considered for, for example, enlargement of high data rate coverage, improvement of group mobility, temporary network deployment, improvement of cell edge throughput and/or provision of network coverage to a new area.

Referring to FIG. 1 again, the RN 120 forwards data transmitted or received between the eNodeB 110 and the UE 131, two different links (backhaul link and access link) are applied to the respective carrier frequency bands having different attributes. The eNodeB 110 may include a donor cell. The RN 120 is wirelessly connected to a radio access network through the donor cell 110.

The backhaul link between the eNodeB 110 and the RN 120 may be represented by a backhaul downlink if downlink frequency bands or downlink subframe resources are used, and may be represented by a backhaul uplink if uplink frequency bands or uplink subframe resources are used. Here, the frequency band is resource allocated in a Frequency Division Duplex (FDD) mode and the subframe is resource allocated in a Time Division Duplex (TDD) mode. Similarly, the access link between the RN 120 and the UE(s) 131 may be represented by an access downlink if downlink frequency bands or downlink subframe resources are used, and may be represented by an access uplink if uplink frequency bands or uplink subframe resources are used. FIG. 1 shows the setting of the backhaul uplink/downlink and the access uplink/downlink of the FDD-mode RN.

The eNodeB must have functions such as uplink reception and downlink transmission and the UE must have functions such as uplink transmission and downlink reception. The RN must have all functions such as backhaul uplink transmission to the eNodeB, access uplink reception from the UE, the backhaul downlink reception from the eNodeB and access downlink transmission to the UE.

Figure 9:
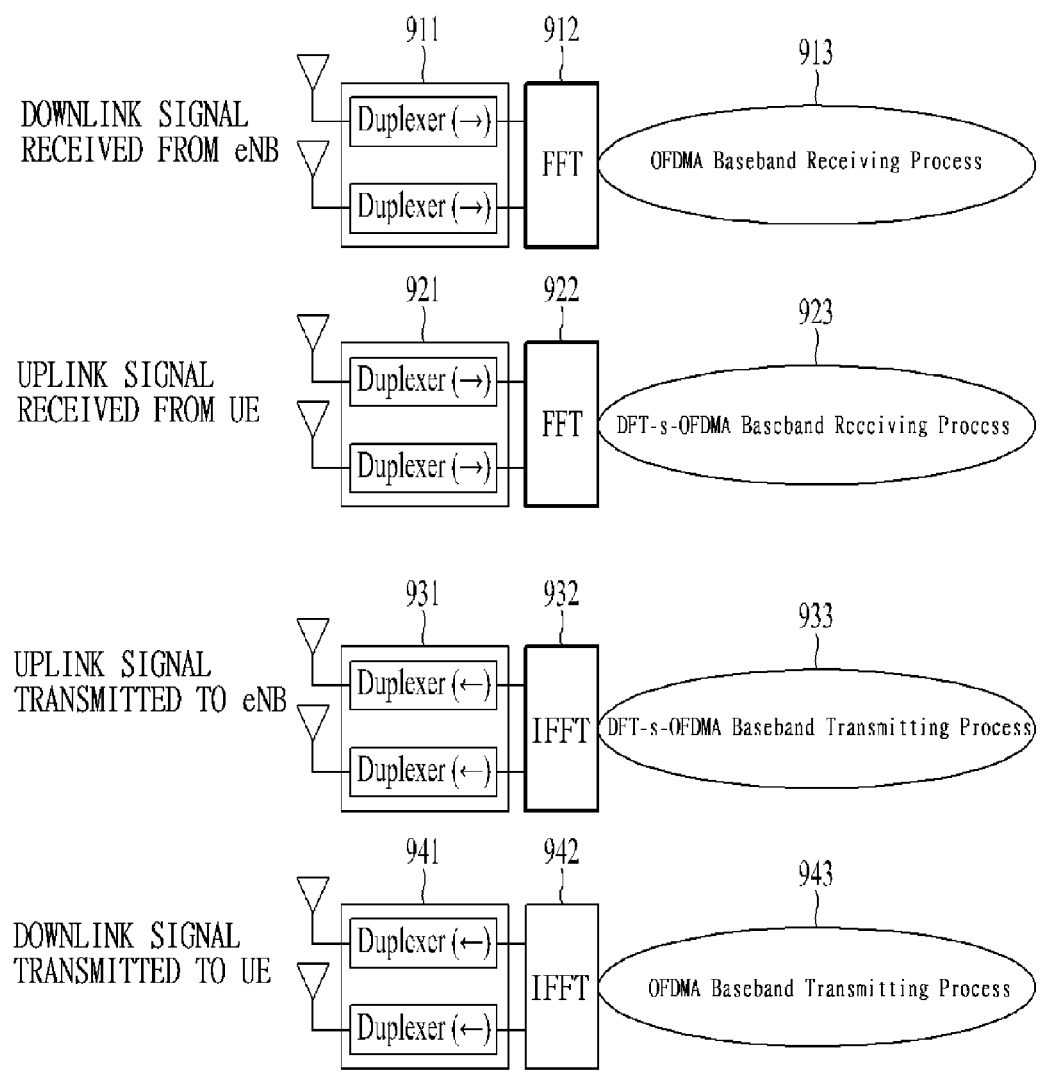
FIG. 9 is a diagram showing an example of implementing transmission and reception functions of a FDD-mode relay node.

FIG. 9 is a diagram showing an example of implementing transmission and reception functions of a FDD-mode RN. The reception function of the RN will now be conceptually described. A downlink signal received from the eNodeB is forwarded to a Fast Fourier Transform (FFT) module 912 through a duplexer 911 and is subjected to an OFDMA baseband reception process 913. An uplink signal received from the UE is forwarded to a FFT module 922 through a duplexer 921 and is subjected to a Discrete Fourier Transform-spread-OFDMA (DFT-s-OFDMA) baseband reception process 923. The process of receiving the downlink signal from the eNodeB and the process of receiving the uplink signal from the UE may be simultaneously performed. The transmission function of the RN will now be described. The uplink signal transmitted to the eNodeB is transmitted through a DFT-s-OFDMA baseband transmission process 933, an Inverse FFT (IFFT) module 932 and a duplexer 931. The downlink signal transmitted to the UE is transmitted through an OFDM baseband transmission process 943, an IFFT module 942 and a duplexer 941. The process of transmitting the uplink signal to the eNodeB and the process of transmitting the downlink signal to the UE may be simultaneously performed. In addition, the duplexers shown as functioning in one direction may be implemented by one bidirectional duplexer. For example, the duplexer 911 and the duplexer 931 may be implemented by one bidirectional duplexer and the duplexer 921 and the duplexer 941 may be implemented by one bidirectional duplexer. The bidirectional duplexer may branch into the IFFT module associated with the transmission and reception on a specific carrier frequency band and the baseband process module line.

In association with the use of the band (or the spectrum) of the RN, the case where the backhaul link operates in the same frequency band as the access link is referred to as "in-band" and the case where the backhaul link and the access link operate in different frequency bands is referred to as "out-band". In both the in-band case and the out-band case, a UE which operates according to the existing LTE system (e.g., Release-8), hereinafter, referred to as a legacy UE, must be able to be connected to the donor cell.

The RN may be classified into a transparent RN or a non-transparent RN depending on whether or not the UE recognizes the RN. The term "transparent" indicates that the UE cannot recognize whether communication with the network is performed through the RN and the term "non-transparent" indicates that the UE recognizes whether communication with the network is performed through the RN.

In association with the control of the RN, the RN may be classified into a RN configured as a part of the donor cell or a RN for controlling the cell.

The RN configured as the part of the donor cell may have a RN ID, but does not have its cell identity. When at least a part of Radio Resource Management (RRM) of the RN is controlled by the eNodeB to which the donor cell belongs (even when the remaining parts of the RRM are located on the RN), the RN is configured as the part of the donor cell. Preferably, such an RN can support a legacy UE. For example, examples of such an RN include various types of relays such as smart repeaters, decode-and-forward relays, L2 (second layer) relays and Type-2 relays.

In the RN for controlling the cell, the RN controls one or several cells, unique physical layer cell identities are provided to the cells controlled by the RN, and the same RRM mechanism may be used. From the viewpoint of the UE, there is no difference between access to the cell controlled by the RN and access to the cell controlled by a general eNodeB. Preferably, the cell controlled by such an RN may support a legacy UE. For example, examples of such an RN include self-backhauling relays, L3 (third layer) relays, Type-1 relays and Type-1a relays.

The Type-1 relay is an in-band relay for controlling a plurality of cells, which appears to be different from the donor cell, from the viewpoint of the UE. In addition, the plurality of cells has respective physical cell IDs (defined in the LTE Release-8) and the RN may transmit its synchronization channel, RSs, etc. In a single-cell operation, the UE may directly receive scheduling information and HARQ feedback from the RN and transmit its control channel (Scheduling Request (SR), CQI, ACK/NACK, etc.) to the RN. In addition, a legacy UE (a UE which operates according to the LTE Release-8 system) regards the Type-1 relay as a legacy eNodeB (an eNodeB which operates according to the LTE Release-8 system). That is, the Type-1 relay has backward compatibility. The UEs which operates according to the LTE-A system regard the Type-1 relay as an eNodeB different from the legacy eNodeB, thereby achieving performance improvement.

The Type-1a relay has the same characteristics as the above-described Type-1 relay except that it operates as an out-band relay. The Type-1a relay may be configured so as to minimize or eliminate an influence of the operation thereof on an L1 (first layer) operation.

The Type-2 relay is an in-band relay and does not have a separate physical cell ID. Thus, a new cell is not established. The Type-2 relay is transparent to the legacy UE and the legacy UE does not recognize the presence of the Type-2 relay. The Type-2 relay can transmit a PDSCH, but does not transmit at least a CRS and a PDCCH.

In order to enable the RN to operate as the in-band relay, some resources in a time-frequency space must be reserved for the backhaul link so as not to be used for the access link. This is called resource partitioning.

The general principle of the resource partitioning in the RN will now be described. The backhaul downlink and the access downlink may be multiplexed on one carrier frequency using a Time Division Multiplexing (TDM) scheme (that is, only one of the backhaul downlink or the access downlink is activated in a specific time). Similarly, the backhaul uplink and the access uplink may be multiplexed on one carrier frequency using the TDM scheme (that is, only one of the backhaul uplink or the access uplink is activated in a specific time).

The multiplexing of the backhaul link using a FDD scheme indicates that backhaul downlink transmission is performed in a downlink frequency band and the backhaul uplink transmission is performed in an uplink frequency band. The multiplexing of the backhaul link using the TDD scheme indicates that the backhaul downlink transmission is performed in a downlink subframe of the eNodeB and the RN and the backhaul uplink transmission is performed in an uplink subframe of the eNodeB and the RN.

In the in-band relay, for example, if the backhaul downlink reception from the eNodeB and the access downlink transmission to the UE are simultaneously performed in a predetermined frequency band, the signal transmitted from the transmitter of the RN may be received by the receiver of the RN and thus signal interference or RF jamming may occur in the RF front end of the RN. Similarly, if the access uplink reception from the UE and the backhaul uplink transmission to the eNodeB are simultaneously performed in a predetermined frequency band, signal interference may occur in the RF front end of the RN. Accordingly, it is difficult to implement the simultaneous transmission and reception in one frequency band at the RN unless the received signal and the transmitted signal are sufficiently separated (for example, unless the transmission antennas and the reception antennas are sufficiently separated from each other (for example, on the ground or under the ground) in terms of geographical positions).

As a method for solving the signal interference, the RN operates so as not to transmit a signal to the UE while a signal is received from the donor cell. That is, a gap may be generated in the transmission from the RN to the UE and any transmission from the RN to the UE (including the legacy UE) may not be performed. Such a gap may be set by configuring a Multicast Broadcast Single Frequency Network (MBSFN) subframe (see FIG. 10). In FIG. 10, a first subframe 1010 is a general subframe, in which a downlink (that is, access downlink) control signal and data is transmitted from the RN to the UE, and a second subframe 1020 is an MBSFN subframe, in which a control signal is transmitted from the RN to the UE in a control region 1021 of the downlink subframe, but any signal is not transmitted from the RN to the UE in the remaining region 1022 of the downlink subframe. Since the legacy UE expects the transmission of the PDCCH in all downlink subframes (that is, the RN needs to enable the legacy UEs within its own area to receive the PDCCH in every subframe so as to perform a measurement function), for the correct operation of the legacy UEs, it is necessary to transmit the PDCCH in all the downlink subframes. Accordingly, even on the subframe (the second subframe 1020) set for the transmission of the downlink (that is, the backhaul downlink) from the eNodeB to the RN, the RN needs to transmit the access downlink in first N (N=1, 2 or 3) OFDM symbol intervals of the subframe, without receiving the backhaul downlink. Since the PDCCH is transmitted from the RN to the UE in the control region 1021 of the second subframe, it is possible to provide backward compatibility to the legacy UE served by the RN. While any signal is not transmitted from the RN to the UE in the remaining region 1022 of the second subframe, the RN may receive the signal transmitted from the eNodeB. Accordingly, the resource partitioning disables the in-band RN to simultaneously perform the access downlink transmission and the backhaul downlink reception.

The second subframe 1022 using the MBSFN subframe will now be described in detail. The control region 1021 of the second subframe may be a RN non-hearing interval. The RN non-hearing interval refers to an interval in which the RN does not receive a backhaul downlink signal and transmits an access downlink signal. This interval may be set to 1, 2 or 3 OFDM lengths as described above. The RN performs the access downlink transmission to the UE in the RN non-hearing interval 1021 and performs the backhaul downlink reception from the eNodeB in the remaining region 1022. At this time, since the RN cannot simultaneously perform the transmission and reception in the same frequency band, it takes a certain length of time to switch the RN from the transmission mode to the reception mode. Accordingly, it is necessary to set a guard time (GT) to switch the RN from the transmission mode to the reception mode in a first portion of the backhaul downlink reception region 1022. Similarly, even when the RN receives the backhaul downlink from the eNodeB and transmits the access downlink to the UE, a guard time (GT) to switch the RN from the reception mode to the transmission mode may be set. The length of the guard time may be set to values of the time domain, for example, values of k (k≥1) time samples Ts or one or more OFDM symbol lengths. Alternatively, if the backhaul downlink subframes of the RN are consecutively set or according to a predetermined subframe timing alignment relationship, the guard time of a last portion of the subframes may not be defined or set. Such a guard time may be defined only in the frequency domain set for the transmission of the backhaul downlink subframe, in order to maintain backward compatibility (the legacy UE cannot be supported if the guard time is set in the access downlink interval). The RN can receive a PDCCH and a PDSCH from the eNodeB in the backhaul downlink reception interval 1022 except for the guard time. Such PDCCH and the PDSCH are physical channels dedicated for RN and thus may be represented by a R-PDCCH (Relay-PDCCH) and a R-PDSCH (Relay-PDSCH).

Multi-carrier Operation of RN

As described above, the RN may operate on multiple carriers. That is, one or more carriers may be aggregated in the backhaul link and one or more carriers may be aggregated in the access link. In this case, the following matters may be considered in the backhaul link transmission and reception of the RN.

In the relay system, if a plurality of frequency bands (that is, a plurality of component carriers (CCs)) is used, there are a mode (mode A) in which the backhaul link and the access link are present in different frequency bands and a mode (mode B) in which the backhaul link and the access link are present in the same frequency band. In the present invention, it is assumed that the RN cannot simultaneously perform the transmission and reception within one frequency band due to interference between the transmitted and received signals (that is, a half-duplex operation is performed in one frequency band). In addition, it is assumed that two different frequency bands are sufficiently separated and the RN can transmit a signal in one band and, at the same time, receive a signal in another band (that is, a full-duplex operation is performed over the two different frequency bands).

Figure 11:
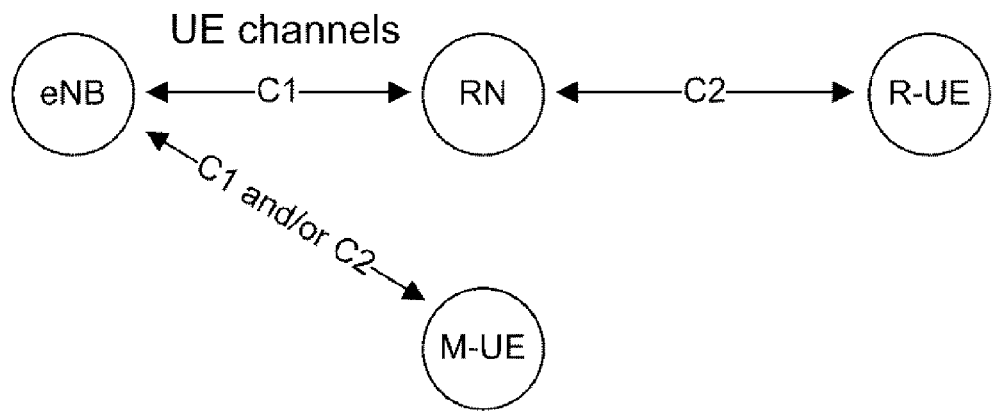
FIG. 11 is a diagram showing an example of a relay operation supporting carrier aggregation.
Figure 11:
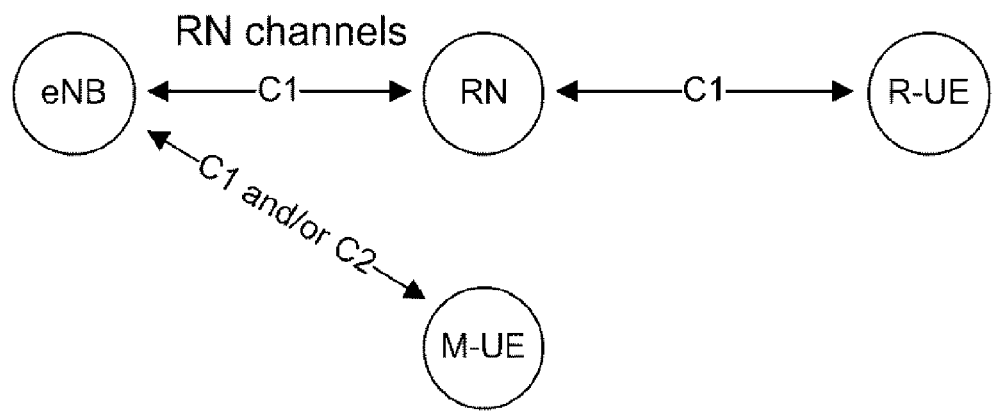

FIG. 11 is a diagram showing a relay operation on two frequency bands C1 and C2. C1 denotes a first CC and C2 denotes a second CC.

FIG. 11(*a*) shows the relay operation in the mode A and FIG. 11(*b*) shows the relay operation in the mode B. In the mode A, the RN may communicate with the eNB and the UE (R-UE) on C1 and C2, respectively. Since the backhaul link and the access link are defined on different frequency bands (C1 and C2) (that is, out-band), the time-domain separation between the backhaul link and the access link is unnecessary, and all channels designed for communication between the eNB and the UE (which are called UE-channels and include a PDCCH, a PDSCH, a PUCCH and a PUSCH) are used for the backhaul link. That is, since the eNB does not need to consider the UE (R-UE) in the relay coverage in the physical channel structure with respect to the RN using the out-band frequency band, the eNB regards the RN as a general UE and can perform communication through the same physical channel structure as the existing UE (macro-UE).

In the mode B, since the backhaul link and the access link are present on the same frequency band C1 (that is, in-band), the time-domain separation between the backhaul link and the access link is necessary. Accordingly, the channel (UE-channel) designed for the existing UE may not be used without change and the channel separately designed for the RN of the mode B (which is called an R-channel and include an R-PDCCH, an R-PDSCH, an R-PUCCH and an R-PUSCH) may be used for the backhaul link.

FIG. 12 is a diagram showing an example of a subframe channel structure allocated to a downlink backhaul link in the mode B. First two or three OFDM symbols of a certain downlink subframe (e.g., a subframe index #3) are used to transmit the PDCCH to the macro-UE. Thereafter, before the backhaul link signal is transmitted to the RN, the guard time (GT) to switch the RN between the transmission mode and the reception mode is allocated.

The backhaul link signal transmitted to the RN includes two different physical channels (R-PDCCH and R-PDSCH). The R-PDCCH includes control information and the R-PDSCH includes data. Primary backhaul resources include the R-PDCCH, and the R-PDCCH and the R-PDSCH may be multiplexed in the primary backhaul resources using a TDM scheme. Secondary backhaul resources do not include an R-PDCCH, and the R-PDCCH of the primary backhaul resources and the R-PDSCH of the secondary backhaul resources may be multiplexed using a FDM scheme.

The multiplexing scheme of the RN channels (R-channels) is exemplary and is not limited to the above scheme. That is, although the R-PDCCH and the R-PDSCH are multiplexed using both the TDM and FDM schemes in FIG. 12, the scheme is not limited thereto and the multiplexing may be performed using the TDM scheme or the FDM scheme. For example, the R-PDCCH and the R-PDSCH may be multiplexed using only the FDM scheme. That is, in the OFDM symbols of the primary backhaul resources, the R-PDSCH is not transmitted, but only the R-PDCCH is transmitted. The R-PDCCH of the primary backhaul resources and the R-PDSCH of the secondary backhaul resources may be multiplexed using the FDM scheme. In addition, the multiplexing scheme of the R-channels may be semi-statically configured by higher layer signaling or dynamically configured by L1/L2 control signals.

The backhaul signals may be multiplexed with the PDSCH directly transmitted from the eNB to the macro-UE (distinguished from the R-PDSCH) in the frequency domain. For the backhaul uplink of the mode B, the R-channels may be designed in a similar manner.

Mixture of In-band and Out-band Backhaul Links

Hereinafter, the case where the in-band and out-band backhaul links are mixed in the relay operation (which may be expressed by an in-band and out-band hybrid relay operation) will be described.

FIG. 13 is a diagram showing an example of the configuration of a backhaul link and an access link, to which the present invention is applied. As shown in FIG. 13, it is assumed that the RN configures the backhaul link with the eNB using two frequency bands (C1 and C2) and configures the access link with the R-UE using one frequency band (C2).

The backhaul link through C1 may be referred to as a relay out-band operation. The backhaul link between the eNB and the RN is allocated to the frequency band C1 and the access link between the RN and the R-UE is allocated to the frequency band C2. That is, since the backhaul link and the access link are allocated to different frequency bands, it is referred to as out-band. In this case, the RN may operate in the mode A on C1. The backhaul link through C2 may be referred to as a relay in-band operation. That is, since both the backhaul link and the access link are allocated to the same frequency band C2, it is referred to as in-band. In this case, the RN may operate in the mode B on C2.

If the backhaul link and the access link are configured as above, in-band and out-band are mixed. The reason why C1 is solely used for the backhaul link and the backhaul link and the access link are multiplexed on C2 using the TDM scheme is because more resources are to be allocated to the backhaul link in consideration that, if the resources of the backhaul link is insufficient, a bottleneck phenomenon occurs and thus the system performance may deteriorate. In addition, if the center frequencies of the frequency bands (CCs) C1 and C2 are different, since there is a difference between in cell coverage between the respective frequency bands and propagation delay may be differently generated, it may not be efficient that both C1 and C2 are used for the access link for the R-UE. In addition, in view of the implementation cost of the RN, the transmitter and the receiver for the transmission and reception between the RN and the R-UE needs to use expensive parts similar to the transmitter and the receiver of the existing eNB, but the transmitter and the receiver for the transmission and reception between the RN and the eNB may use cheap parts similar to the transmitter and the receiver of the existing UE. Accordingly, cost consumed for adding the transmitter and the receiver for the in-band operation in a separate frequency band to the configuration of the RN for the in-band operation in a specific frequency band is high, but cost consumed for adding the transmitter and the receiver for the out-band operation in a separate frequency band is relatively low. Accordingly, in consideration of the above-described various viewpoints, for example, if the RN uses two frequency bands (CCs), it is preferable that the in-band operation is performed in one frequency band and the out-band operation is performed in the other frequency band.

As shown in FIG. 13(a), the eNB may communicate with the M-UE through the frequency band C2. The backhaul link configured on the frequency C1 among the backhaul links between the eNB and the RN may be configured on the frequency band different from that of the link between the eNB and the M-UE configured on the frequency band C2. In this case, since the RN can transmit and receive the backhaul signal using C1 corresponding to the separate resources other than the resources C2 used for the M-UE, it is advantageous in that the amount of resources allocated to the M-UE is preserved.

As shown in FIG. 13(b), the eNB may communicate with the M-UE through the frequency band C1 (or C1 and C2). The backhaul link configured on the frequency band C1 among the backhaul links between the eNB and the RN may be configured on the same frequency band as the link between the eNB and the M-UE configured on the frequency band C1. In this case, it is advantageous in that the backhaul link of the RN may maximally share the resources with the M-UE and an operation such as multi-user MIMO (MU-MIMO) between the M-UE and the RN can be smoothly performed.

Hereinafter, the detailed proposals of the present invention when the in-band and out-band backhaul links are mixed will be described.

Embodiment 1

Various embodiments in which the transmission of the physical channel is controlled according to a physical channel type (UE-channel or R-channel) with respect to the backhaul link transmission/reception between the eNB and the RN will be described with reference to FIG. 14.

FIG. 14 is a diagram conceptually illustrating physical channel control on each frequency band (CC).

In a scheme 1 shown in FIG. 14(a), channels on respective frequency bands (CCs) are controlled by a control channel on the same frequency band. For example, the PDSCH/PUSCH/PUCCH on C1 may be controlled by the PDCCH on C1, the R-PDSCH/R-PUSCH/R-PUCCH on C2 may be controlled by the R-PDCCH on C2. The control information included in the PDCCH or the R-PDCCH may include information about scheduling, resource allocation, power control, etc. Such a scheme is equal to the existing physical channel control configuration and thus may be simply implemented. However, overhead associated with blind decoding of the control channel may be increased.

In a scheme 2 shown in FIG. 14(b), channels on a plurality of frequency bands (CCs) are controlled by a control channel on the frequency band operating in the mode A (that is, out-band). For example, the PDSCH/PUSCH/PUCCH on C1 and the R-PDSCH/R-PUSCH/R-PUCCH on C2 may be controlled by the PDCCH on C1. According to such a scheme, the RN may consecutively receive the control channel on the frequency band (C1) operating in the mode A.

In a scheme 3 shown in FIG. 14(c), channels on a plurality of frequency bands (CCs) are controlled by a control channel on the frequency band operating in the mode B (that is, in-band). For example, the PDSCH/PUSCH/PUCCH on C1 and the R-PDSCH/R-PUSCH/R-PUCCH on C2 may be controlled by the R-PDCCH on C2. Such a scheme is not efficient in the resource usage because the R-PDCCH is separately defined in the data region of the subframe, but may be efficient when it is difficult to perform reliable control channel transmission on C1. For example, this scheme may be applied when C1 is an extended CC without the PDCCH. Alternatively, this scheme may be applied when fractional frequency reuse is applied and transmit power on C1 is lower than the transmit power on C2.

In the above-described schemes, the eNB may inform the RN of the location of the control channel which must be monitored by the RN through higher layer signaling (e.g., RRC signaling). The RN may change the control channel to be monitored according to signaling from the eNB.

In addition, in the above-described schemes 2 and 3, the cross-channel control capability is required. The cross-channel control capability refers to capability to provide control information of a different type of channel, and, in the present embodiment, indicates that the control channel of the UE-channel provides control information of the R-channel or the control channel of the R-channel provides control information of the UE-channel. That is, the PDCCH on C1 may have control capability of the R-channels in the scheme 2, and the R-PDCCH on C2 may have control capability of UE-channels in the scheme 3. The control channel may include an indicator indicating the type (UE-channel or R-channel) of the controlled channel to the RN.

In the above example, each of the frequency bands C1 and C2 may be a FDD band having an uplink CC and a downlink CC. Alternatively, each of the frequency bands C1 and C2 may be a TDD band in which the uplink transmission and the downlink transmission are identified on one CC in the time domain.

Alternatively, one of the two frequency bands C1 and C2 may be a FDD band and the other band thereof may be a TDD band. For example, C1 may be a FDD band and C2 may be a TDD band.

The frequency bands C1 and c2 may be set to a pair for the FDD operation. For example, C1 may be an uplink carrier frequency and C2 may be a downlink frequency band of the same frequency band.

Embodiment 2

If an out-band backhaul link CC is present, the out-band backhaul link CC may be set to a primary CC (which may be also called an "anchor CC") of the backhaul link between the eNB and the RN. The primary CC refers to a CC on which uplink/downlink control information is transmitted.

In other words, if the RN has one or more out-band backhaul link CCs used to transmit and receive the control channel in every subframe, the in-band backhaul link CC multiplexed with the access link using the TDM scheme may not be set to the primary CC of the backhaul link. For example, in FIG. 13, the CC C1 may be set to the primary CC. In addition, as described with reference to FIG. 14(b), by the control channel (PDCCH) which is the UE-channel on C1, the UE-channel (PDSCH/PUSCH/PUCCH) on C1 may be controlled and the R-channel (R-PDSCH/R-PUSCH/R-PUCCH) on C2 may be controlled (cross-carrier scheduled). This is because it is not efficient that a separate R-PDCCH is set to be monitored if the RN can monitor the PDCCH and acquire control information of the other UE-channels and R-channels according to the received PDCCH.

According to such configuration, since the RN has an opportunity to transmit or receive control information on all subframes of the uplink or downlink, it is possible to perform the consecutive control information transmission/reception of the RN. In contrast, if the in-band backhaul link CC is set to the primary CC, since the RN can transmit the control information to the eNB or receive the control information from the eNB only in the subframe except for the subframe used to receive the backhaul downlink from the eNB and the subframe used to receive the access uplink from the UE, it is impossible to perform the consecutive control information transmission/reception of the RN in the in-band backhaul link CC.

Figure 15:
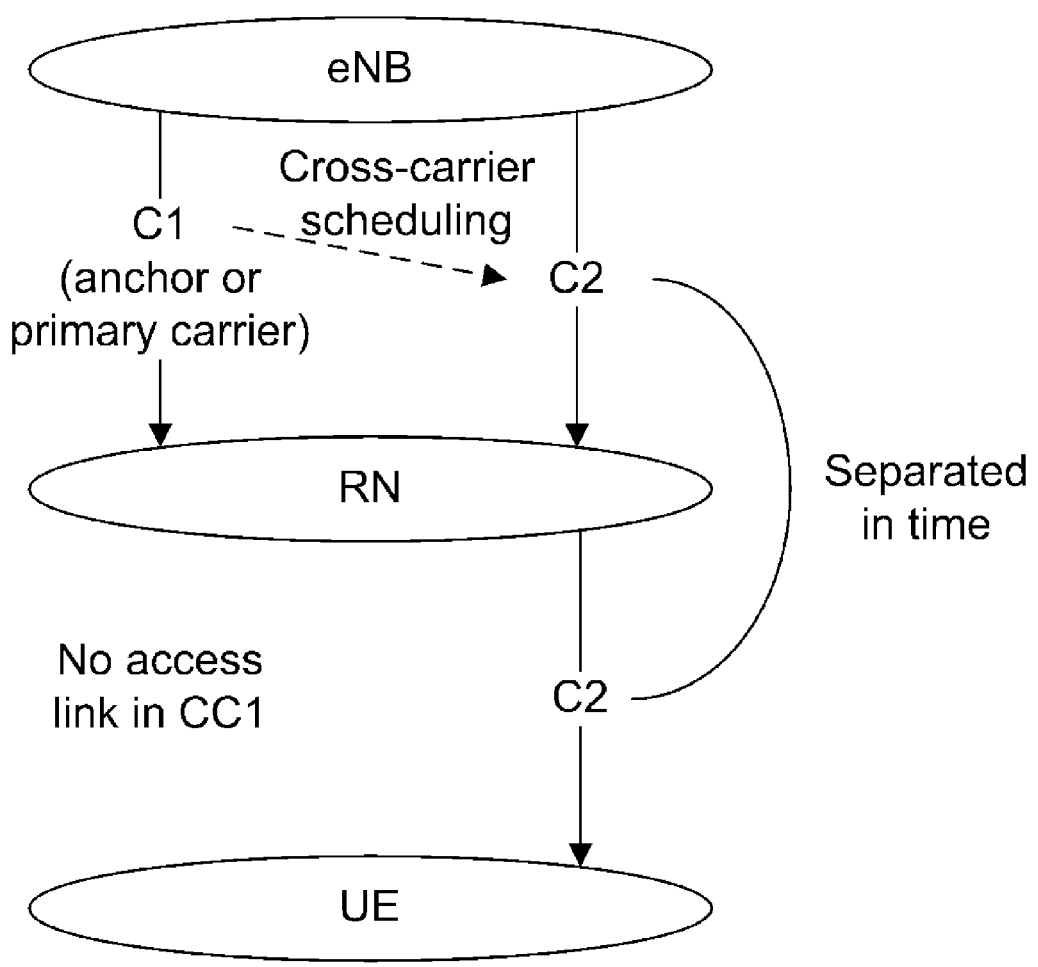
FIG. 15 is a diagram illustrating an in-band and out-band hybrid relay operation.

FIG. 15 is a diagram illustrating an example of a backhaul link relay operation when the in-band and out-band backhaul links are mixed. Referring to FIG. 15, C1 may be set to the backhaul primary CC. The RN may operate in the mode A on C1 and operate in the mode B on C2.

In the configuration shown in FIG. 15, for example, scheduling control information for uplink/downlink transmission on the out-band CC C1 may be transmitted on the CC C1 and scheduling control information for uplink/downlink transmission on the in-band CC C2 may be transmitted on C1, that is, cross-carrier scheduling may be performed. The cross-carrier scheduling in downlink refers to the case where control information (DL allocation PDCCH) for scheduling PDSCH transmission on the first downlink CC (first DL CC) is transmitted not on the first DLCC, but on another DL CC (e.g., a second DL CC). The cross-carrier scheduling in uplink refers to the case where control information (UL grant PDCCH) for scheduling PUSCH transmission on a first UL CC is transmitted not on a DL CC set to be linked with the first UL CC (e.g., a first DL CC), but on another DL CC (e.g., a second DL CC).

Alternatively, one out-band backhaul link CC C1 may be used only for control signal transmission/reception, one or more in-band backhaul link CC(s) may be used for data signal transmission/reception. Here, one or more in-band backhaul link CC(s) may be cross-carrier scheduled by one out-band backhaul link CC C1.

If the usage of each CC is differently set, a determination as to which of CCs is used for control signal transmission or data transmission may be made according to the following criterion.

A CC (or a frequency band) having a narrow bandwidth and a low center frequency may be suitable for control signal transmission/reception. This is because the control signal does not require more resources compared with the data signal, a low center frequency leads to low path loss, and thus the control signal through CC having narrow bandwidth and low center frequency is suitable for a UE having high mobility. In addition, a CC (or a frequency band) having a wide bandwidth and a high center frequency may be suitable for data signal transmission/reception. This is because the data signal requires more resources compared with the control signal, a high center frequency leads to high path loss, and thus the data signal through CC having wide bandwidth and high center frequency is suitable for a UE having low mobility and therefore being connected to RN having small coverage.

In addition, the subframe allocation scheme may be changed according to the type of the primary CC (or the anchor carrier), that is, depending on whether the primary CC is a UE-channel (PDCCH/PUCCH) or an R-channel (R-PDCCH/R-PUCCH).

If the RN operates on an in-band CC and the primary CC is an in-band CC, since an opportunity to transmit the R-PDCCH/R-PUCCH is given to only some subframes to which the access link subframe is not allocated, the continuity of the control channel transmission may not be guaranteed. In other words, in the in-band operation, since the backhaul link and the access link are multiplexed on one CC using the TDM scheme, it may not be guaranteed that a certain subframe is definitely allocated to the backhaul link transmission. Accordingly, in order to provide continuity of the control channel transmission, the allocation of a pair of subframes (or the allocation of associated subframes) may be considered in the allocation of the downlink and uplink backhaul subframe. The allocation of the pair of subframes may be set according to the relationship between the uplink and downlink subframes in a scheduling operation or a HARQ operation.

For example, if an uplink subframe (e.g., a subframe index n) is allocated to backhaul uplink transmission, a specific downlink subframe (e.g., a subframe index n−4) needs to be allocated to backhaul downlink transmission. This is because an R-PDCCH including an uplink grant message used to schedule uplink transmission of a specific subframe needs to be transmitted prior to a specific number of subframes which corresponds to 4 ms (four subframes). Similarly, if a downlink subframe (e.g., a subframe index m) is allocated to backhaul downlink transmission, a specific uplink subframe (e.g., a subframe index m+4) needs to be allocated to backhaul uplink transmission. This is because HARQ ACK/NACK information for downlink transmission of a specific subframe is transmitted after a specific number of subframes which corresponds to 4 ms (four subframes). Accordingly, if the primary CC is set to an in-band CC, since the allocation of the backhaul subframe is restricted, the operation of the R-UE through the access link may be influenced.

In order to solve this problem, instead of the existing 4 ms-based scheduling operation or HARQ operation, a scheduling operation or HARQ operation with another period (e.g., 10 ms) may be separately configured. Alternatively, the HARQ operation may be set such that, after backhaul uplink transmission is performed, an ACK/NACK signal thereof is not transmitted through a backhaul downlink PHICH, that is, the RN does not expect the ACK/NACK signal for the backhaul uplink transmission. However, the introduction of the separate scheduling operation or HARQ operation may lead to complexity and overhead of the transmission/reception operation.

If the primary CC is an out-band CC, the allocation of a pair of backhaul subframes does not need to be introduced to a CC operating in an in-band mode. This is because all associated control signals (UL grant control information, DL allocation control information, UL ACK/NACK, DL ACK/NACK or the like) can be transmitted in any subframe on the out-band primary CC. Accordingly, completely flexible subframe allocation is possible in the uplink and downlink backhaul subframe allocation. In other words, the uplink and downlink backhaul subframe allocation may be mutually independent. For example, the RN may perform backhaul uplink transmission through C2 according to the UL grant transmitted on the out-band primary CC C1 and then receive a backhaul downlink ACK/NACK thereof through C1.

In order to support such an operation, the backhaul subframe allocation scheme may be changed according to the operation mode on the primary CC of the RN.

If the RN performs an out-band operation on a primary CC (that is, if an access link is not set on a primary CC), the uplink and downlink subframe allocation may be independently configured. The independent uplink and downlink allocation may be applied on the in-band CC which is cross-carrier scheduled by the primary CC. For example, in this case, a separate bitmap message for the uplink/downlink subframe allocation may be used.

In contrast, if the RN performs an in-band operation on a primary CC (that is, if an access link is set on a primary CC), the uplink and downlink subframe allocation may be configured in a paired (or associated) manner. For example, if the downlink backhaul subframe is allocated by a bitmap message, the uplink backhaul subframe allocation may be determined based on a predetermined rule according to the downlink backhaul subframe allocation. The predetermined rule may be determined according to the scheduling operation or the HARQ operation as described above. For example, a subframe n may be allocated to an uplink backhaul subframe according to the scheduling operation, and a subframe n−4 may be allocated to the downlink backhaul subframe in order to transmit the UL grant for the uplink transmission of the subframe n. In addition, a subframe m may be allocated to the downlink backhaul subframe, and a subframe m+4 may be allocated to the uplink backhaul subframe according to the HARQ ACK/NACK operation in order to transmit the ACK/NACK signal for the downlink transmission of the subframe m.

Embodiment 3

The backhaul link transmission/reception operation and the type (UE-channel or R-channel) of the control channel indicating the operation may be connected. Here, the backhaul link transmission/reception operation may include various features such as ACK/NACK, retransmission, or UL grant. The backhaul link transmission/reception operation may be different on the out-band CC and the in-band CC.

For example, non-adaptive uplink retransmission based on the PHICH is possible in the out-band CC. However, since the downlink physical channel for the downlink ACK/NACK transmission is not provided on the in-band CC, non-adaptive uplink re-transmission may be impossible in the in-band CC.

Alternatively, while synchronous uplink retransmission with a period of 8 ms is used in the out-band CC, synchronous uplink retransmission with another period of 10 ms or asynchronous uplink retransmission may be used in the in-band CC such that the operation is performed according to the irregular backhaul subframe configuration.

Accordingly, if the in-band and out-band backhaul links are mixed in the relay operation, it is necessary to define how the backhaul link transmission/reception according to the operation mode of the backhaul link CC is performed.

Figure 16:
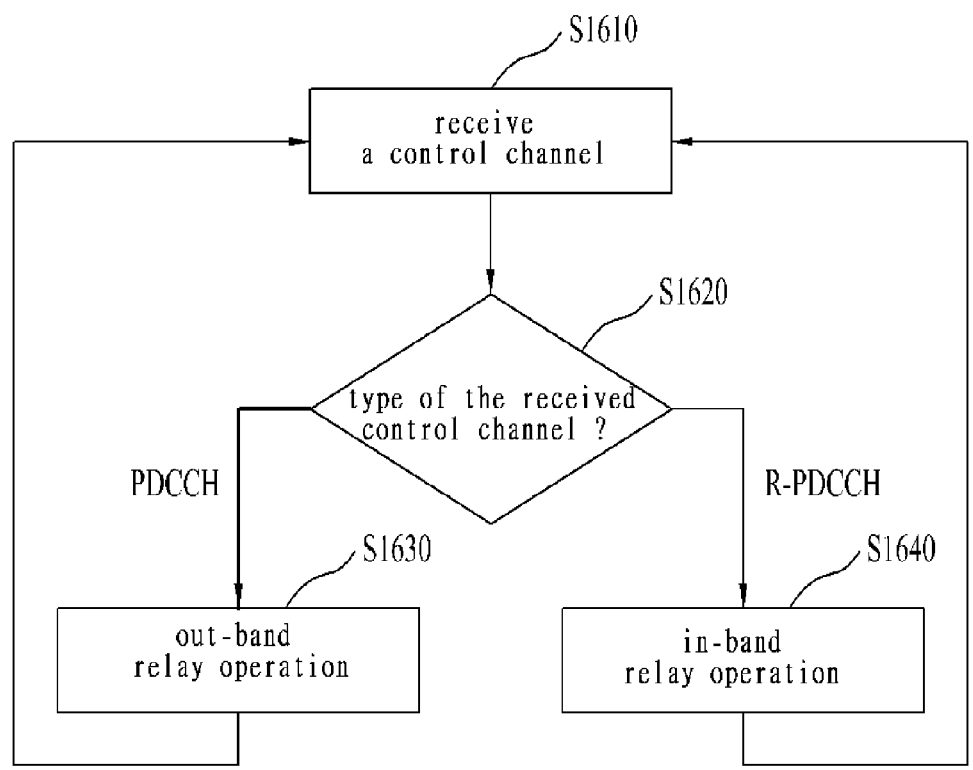
FIG. 16 is a flowchart illustrating a relay operating method according to an embodiment of the present invention.

As shown in FIG. 16, the operation mode of the backhaul link CC may be determined according to the operation mode of the CC (that is, the type (UE-channel or R-channel) of the control channel indicating the backhaul link transmission/reception).

Referring to FIG. 16, the RN may receive the control channel from the eNB in step S1610. In step S1620, RN may determine the type of the received control channel, that is, whether the received control channel is a UE-channel (e.g., PDCCH) or an R-channel (e.g., an R-PDCCH). If the control channel is the UE-channel in step S1620, step S1630 is performed and, if the control channel is the R-channel, step S1640 is performed. If the received control channel is the UE-channel (PDCCH), the RN may operate according to the out-band operation mode in step S1630. If the received control channel is the R-channel (R-PDCCH), the RN may operate according to the in-band operation mode in step S1640. Thereafter, the RN may receive a new control channel in step S1610 and perform the in-band or out-band operation according to the type of the received control channel.

For example, if uplink transmission is indicated by the PDCCH (that is, the UE-channel) located on the out-band CC, the backhaul link transmission/reception procedure indicated by the PDCCH may be performed according to the operation on the out-band CC. In this case, non-adaptive retransmission based on the PHICH is possible and synchronous retransmission with a period of 8 ms is possible.

Alternatively, if uplink transmission is indicated by the R-PDCCH (that is, R-channel) located on the in-band CC, the backhaul link transmission/reception procedure indicated by the R-PDCCH may be performed according to the operation on the in-band CC. In this case, DL ACK/NACK may not be present (that is, after the RN perform backhaul uplink transmission, the eNB does not transmit ACK/NACK through the backhaul downlink PHICH), synchronous retransmission with a period (e.g., 10 ms) other than a period of 8 ms may be performed or asynchronous retransmission is possible.

According to the present embodiment, the backhaul link transmission/reception operation mode of the RN is not determined according to the relay operation mode on the CC on which data is transmitted and received (that is, the backhaul link transmission/reception operation mode of the RN does not depend on whether the CC on which data is transmitted and received is an out-band or in-band).

Although the number of CCs (or frequency bands) allocated to the RN is two in the above-described embodiments of the present invention, the number of CCs is not limited thereto. That is, similar to the above-described principle of the present invention, even when two or more CCs are allocated to the RN, cross-channel scheduling (scheduling for different types of channels) may be applied, one of out-band CCs may be set to a primary CC, and an out-band operation or an in-band operation may be performed according to the type (UE-channel or R-channel) of the received control channel.

Figure 17:
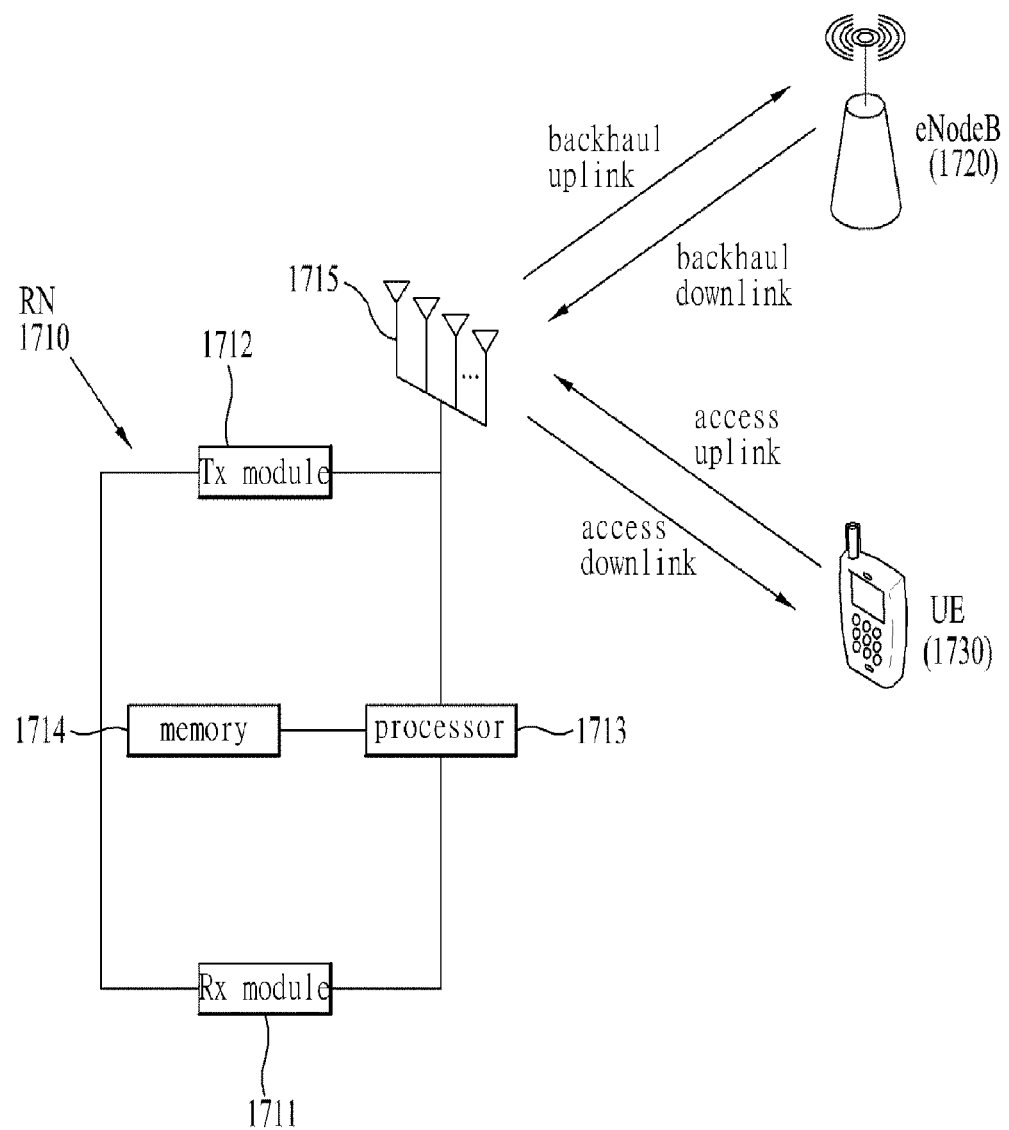
FIG. 17 is a diagram showing the configuration of a radio communication system including a RN device, an eNodeB device, a UE device according to an exemplary embodiment of the present invention.

FIG. 17 is a diagram showing the configuration of a radio communication system including a RN device, an eNodeB device, a UE device according to an exemplary embodiment of the present invention. The detailed configuration of the RN device 1710 will be described with reference to FIG. 17.

The RN 1710 may transmit and receive control information and/or data through a backhaul uplink and a backhaul downlink. In addition, the RN 1710 may transmit and receive control information and/or data to or from a UE 1730 through an access downlink and an access uplink.

The RN 1710 may include a reception module 1711, a transmission module 1712, a processor 1713, a memory 1714, and a plurality of antennas 1715. This RN supports a Multi-Input Multi-Output (MIMO) scheme because the plurality of antennas is used.

The reception module 1711 may receive a variety of signals, data and information on the backhaul downlink from the eNodeB and the access uplink from the UE. The transmission module 1712 may transmit a variety of signals, data and information on the backhaul uplink to the eNodeB and the access downlink to the UE. The processor 1713 may control the overall operation of the RN 1710. In particular, the process 1713 may control the transmission and the reception of the variety of signals, data and information through the reception module 1711 and the transmission module 1712.

In the exemplary embodiment of the present invention, the RN 1710 supports the transmission and reception through multiple carriers. That is, the RN 1710 may communicate with the eNodeB 1720 and the UE 1730 through one or more CCs. In one embodiment of the present invention, the multiple carriers associated with the relay operation may include one or more in-band CCs and one or more out-band CCs. That is, the RN may be an in-band and out-band hybrid RN.

The processor 1713 of the RN 1710 may receive the control channel from the eNodeB through the reception module 1711 and determine the type of the received control channel. The type of the control channel may be determined depending on whether the CC on which the control channel is received is an in-band CC or an out-band CC. The channel type may be one of the UE-channel or the R-channel. In addition, the control channel may be received through a primary CC. Preferably, the primary CC may be set to one of out-band CCs. In addition, the control channel may include at least one of control information for the channel of the same type of the control channel and control information for the channel of the type different from that of the control channel. That is, cross-channel scheduling may be performed by the control channel.

In addition, the processor 1713 of the RN 1710 may determine an in-band operation mode or an out-band operation mode based on the determined type of the control channel, and transmit and receive signals to or from at least one of the eNodeB and the UE through the reception module 1711 and the transmission module 1712 according to the determined operation mode. The in-band operation mode refers to an operation mode in which the backhaul link and the access link are set on the same CC and the out-band operation mode refers to an operation mode in which the backhaul link and the access link are set on different CCs.

The matters described in the various embodiments of the present invention may be applied to the configuration of the RN device 1710 and the detailed description thereof will be omitted, for clarification. That is, the detailed content associated with the relay operation described in the present specification may be implemented on the various components of the RN device.

The processor 1713 of the RN 1710 performs a function for calculating information received by the RN and information to be transmitted to an external device, and the memory 1714 may store the calculated information and may be replaced with a component such as a buffer (not shown).

The above-described embodiments of the present invention can be implemented by a variety of means, for example, hardware, firmware, software, or a combination of them.

In the case of implementing the present invention by hardware, the present invention can be implemented with application specific integrated circuits (ASICs), Digital signal processors (DSPs), digital signal processing devices (DSPDs), programmable logic devices (PLDs), field programmable gate arrays (FPGAs), a processor, a controller, a microcontroller, a microprocessor, etc.

If operations or functions of the present invention are implemented by firmware or software, the present invention can be implemented in the form of a variety of formats, for example, modules, procedures, functions, etc. The software codes may be stored in a memory unit so that it can be driven by a processor. The memory unit is located inside or outside of the processor, so that it can communicate with the aforementioned processor via a variety of well-known parts.

The detailed description of the exemplary embodiments of the present invention has been given to enable those skilled in the art to implement and practice the invention. Although the invention has been described with reference to the exemplary embodiments, those skilled in the art will appreciate that various modifications and variations can be made in the present invention without departing from the spirit or scope of the invention described in the appended claims. For example, those skilled in the art may use each construction described in the above embodiments in combination with each other. Accordingly, the invention should not be limited to the specific embodiments described herein, but should be accorded the broadest scope consistent with the principles and novel features disclosed herein.

Those skilled in the art will appreciate that the present invention may be carried out in other specific ways than those set forth herein without departing from the spirit and essential characteristics of the present invention. The above exemplary embodiments are therefore to be construed in all aspects as illustrative and not restrictive. The scope of the invention should be determined by the appended claims and their legal equivalents, not by the above description, and all changes coming within the meaning and equivalency range of the appended claims are intended to be embraced therein. Also, it will be obvious to those skilled in the art that claims that are not explicitly cited in the appended claims may be presented in combination as an exemplary embodiment of the present invention or included as a new claim by subsequent amendment after the application is filed.

INDUSTRIAL APPLICABILITY

The embodiments of the present invention are applicable to various mobile communication systems.

It will be apparent to those skilled in the art that various modifications and variations can be made in the present invention without departing from the spirit or scope of the invention. Thus, it is intended that the present invention cover the modifications and variations of this invention provided they come within the scope of the appended claims and their equivalents.

The invention claimed is:

1. A method for transmitting and receiving a signal in a relay node operating on multiple carriers, the method comprising:
  receiving a control channel from a base station;
  determining a type of the control channel, wherein the type of the control channel is determined depending on whether a component carrier through which the control channel is received is an in-band component carrier or an out-band component carrier;
  determining an in-band operation mode or an out-band operation mode based on the determined type of the control channel; and
  transmitting and receiving the signal to and from at least one of the base station or a user equipment according to the determined operation mode, wherein the multiple carriers include one or more in-band component carriers and one or more out-band component carriers,
  wherein the control channel is a physical downlink control channel (PDCCH) when the control channel is received through the out-band component carrier, and
  wherein the control channel is a relay-PDCCH (R-PDCCH) when the control channel is received through the in-band component carrier.

2. The method according to claim 1, wherein the control channel is received through a primary component carrier of the multiple carriers.

3. The method according to claim 2, wherein the primary component carrier is one of the one or more out-band component carriers.

4. The method according to claim 1, wherein the control channel includes at least one of control information for a channel of the same type as the control channel or control information for a channel of a type different from that of the control channel.

5. The method according to claim 1, wherein:
the in-band operation mode is an operation mode in which a backhaul link between the base station and the relay node and an access link between the relay node and a User Equipment (UE) are set on the same component carrier, and
the out-band operation mode is an operation mode in which the backhaul uplink between the base station and the relay node and the access link between the relay node and the UE are set on different component carriers.

6. A relay node operating on multiple carriers, the relay node comprising:
a reception module configured to receive a backhaul downlink from a base station and an access uplink from a user equipment;
a transmission module configured to transmit a backhaul uplink to the base station and an access downlink to the user equipment; and
a processor configured to control the reception module and the transmission module, wherein the processor is further configured to:
receive a control channel from the base station through the reception module,
determine a type of the control channel, wherein the type of the control channel is determined depending on whether a component carrier through which the control channel is received is an in-band component carrier or an out-band component carrier,
determine an in-band operation mode or an out-band operation mode based on the determined type of the control channel, and
transmit and receive a signal to and from at least one of the base station and the or the user equipment according to the determined operation mode, and
wherein the multiple carriers include one or more in-band component carriers and one or more out-band component carriers,
wherein the control channel is a physical downlink control channel (PDCCH) when the control channel is received through the out-band component carrier, and
wherein the control channel is a relay-PDCCH (R-PDCCH) when the control channel is received through the in-band component carrier.

* * * * *